United States Patent
Beaurepaire et al.

(10) Patent No.: US 12,282,505 B2
(45) Date of Patent: Apr. 22, 2025

(54) METHOD, APPARATUS, AND SYSTEM FOR COMPUTING A SPATIAL FOOTPRINT INDEX

(71) Applicant: HERE Global B.V., Eindhoven (NL)

(72) Inventors: Jerome Beaurepaire, Berlin (DE); Gianpietro Battistutti, Berlin (DE)

(73) Assignee: HERE Global B.V., Eindhoven (NL)

( * ) Notice: Subject to any disclaimer, the term of this patent is extended or adjusted under 35 U.S.C. 154(b) by 944 days.

(21) Appl. No.: 17/103,503

(22) Filed: Nov. 24, 2020

(65) Prior Publication Data
US 2022/0163335 A1    May 26, 2022

(51) Int. Cl.
G06F 16/00    (2019.01)
G06F 16/387    (2019.01)

(52) U.S. Cl.
CPC .................... G06F 16/387 (2019.01)

(58) Field of Classification Search
CPC ............. G06F 16/387; G01C 21/3415; G01C 21/3476; G01C 21/3492; H04W 4/35; H04W 4/38; H04W 4/029
See application file for complete search history.

(56) References Cited

U.S. PATENT DOCUMENTS

| | | | | |
|---|---|---|---|---|
| 9,382,068 | B1 * | 7/2016 | Quan | G06Q 10/083 |
| 9,613,055 | B2 * | 4/2017 | Tyercha | G06F 16/221 |
| 10,424,202 | B1 * | 9/2019 | Beaurepaire | G01C 21/3685 |
| 11,010,427 | B2 * | 5/2021 | Black | G06F 16/9537 |
| 2004/0169587 | A1 * | 9/2004 | Washington | G06K 7/10079 |
| | | | | 340/572.1 |
| 2005/0067492 | A1 * | 3/2005 | Amitay | G06Q 30/02 |
| | | | | 340/8.1 |
| 2010/0114905 | A1 * | 5/2010 | Slavik | G06F 16/29 |
| | | | | 707/743 |
| 2010/0287178 | A1 * | 11/2010 | Lambert | G01S 5/0244 |
| | | | | 707/765 |

(Continued)

FOREIGN PATENT DOCUMENTS

| | | |
|---|---|---|
| CN | 109409244 A | 3/2019 |
| WO | 2020104366 A1 | 5/2020 |

OTHER PUBLICATIONS

Rodrigue, "The Environmental Footprint of Transportation", retrieved on Nov. 24, 2020 from https://transportgeography.org/?page_id=5721, 16 pages.

*Primary Examiner* — Dinku W Gebresenbet
(74) *Attorney, Agent, or Firm* — DITTHAVONG, STEINER & MLOTKOWSKI

(57) ABSTRACT

An approach is disclosed for computing a spatial footprint index. The approach involves, for example, receiving, by one or more processors, information indicating that one or more physical items are associated with a user, a set of users, or a combination thereof. The approach also involves determining, by the one or more processors, spatial data indicating a physical space occupied by the one or more physicals items. The approach further involves computing, by the one or more processors, a spatial footprint index for the user, the set of users, or a combination thereof based on the spatial data, wherein the spatial footprint index is a quantified representation of the physical space occupied by the one or more physical items. The approach further involves providing, by the one or more processors, the spatial footprint index as an output.

20 Claims, 13 Drawing Sheets

(56) References Cited

U.S. PATENT DOCUMENTS

| | | | |
|---|---|---|---|
| 2013/0073350 A1* | 3/2013 | Blustein | G08G 1/14 |
| | | | 705/13 |
| 2013/0290044 A1 | 10/2013 | Webb et al. | |
| 2016/0163107 A1* | 6/2016 | Chen | G01B 11/24 |
| | | | 345/419 |
| 2016/0321566 A1 | 11/2016 | Liu et al. | |
| 2019/0043214 A1* | 2/2019 | Chilcote-Bacco | G06T 7/70 |
| 2019/0155835 A1* | 5/2019 | Daugharthy | G06T 7/194 |
| 2019/0353486 A1* | 11/2019 | Beaurepaire | G01C 21/3626 |
| 2020/0202593 A1* | 6/2020 | Black | G06T 11/206 |

\* cited by examiner

| Object/Element 201 | Size (with buffer) 205 | Static/dynamic 207 | Overall value for the computation of the index 203 |
|---|---|---|---|
| House 209 | 250 m² | Static | Size * duration * context cost |
| Summer House 213 | 120 m² | Static | Size * duration * context cost |
| Car 1 211 | 8 m² | Static + dynamic | Size * duration * context cost |
| Car 2 215 | 10 m² | Static + dynamic | Size * duration * context cost |
| Bike 217 | 0.5 m² | Static + dynamic | Size * duration * context cost |
| User 219 | 0.5 m² | Mostly dynamic | Size * duration * context cost |

200

METHOD, APPARATUS, AND SYSTEM FOR COMPUTING A SPATIAL FOOTPRINT INDEX

BACKGROUND

Location-based service providers (e.g., mapping and navigation providers) are continually challenged to provide compelling services and applications. One area of development relates to human population modeling (e.g., respective densities, land use, changes over time, etc.). As human density likely increases over time, particularly in urban areas, the availability of valuable public space may become a scarce resource and the misuse and/or inefficient use of such space may have a detrimental impact on the society at large. If users are aware of their respective spatial footprints, they may be more likely to not abuse public spaces and/or not use such spaces disproportionality. However, the dynamic nature of populations and the vast amount of information required to compute the spatial footprints for all users makes it difficult and costly for service providers to quickly and accurately produce such information before that information may become outdated and/or inaccurate (i.e., stale). Accordingly, service providers face significant technical challenges to enable users to be aware of their overall spatial footprint.

Some Example Embodiments

Therefore, there is a need for an approach for enabling users to be aware of their overall spatial footprint.

According to one embodiment, a method comprises receiving, by one or more processors, information indicating that one or more physical items are associated with a user, a set of users, or a combination thereof. The method also comprises determining, by the one or more processors, spatial data indicating a physical space occupied by the one or more physicals items. The method further comprises computing, by the one or more processors, a spatial footprint index for the user, the set of users, or a combination thereof based on the spatial data, wherein the spatial footprint index is a quantified representation of the physical space occupied by the one or more physical items. The method further comprises providing, by the one or more processors, the spatial footprint index as an output.

According to another embodiment, an apparatus comprises at least one processor, and at least one memory including computer program code for one or more computer programs, the at least one memory and the computer program code configured to, with the at least one processor, cause, at least in part, the apparatus to receive, by one or more processors, information indicating that one or more physical items are associated with a user, a set of users, or a combination thereof. The apparatus is also caused to determine, by the one or more processors, spatial data indicating a physical space occupied by the one or more physicals items. The apparatus is further caused to compute, by the one or more processors, a spatial footprint index for the user, the set of users, or a combination thereof based on the spatial data, wherein the spatial footprint index is a quantified representation of the physical space occupied by the one or more physical items. The apparatus is further caused to provide, by the one or more processors, the spatial footprint index as an output.

According to another embodiment, a non-transitory computer-readable storage medium having stored thereon one or more program instructions which, when executed by one or more processors, cause, at least in part, an apparatus to receive, by the one or more processors, information indicating that one or more physical items are associated with a user, a set of users, or a combination thereof. The apparatus is also caused to determine, by the one or more processors, spatial data indicating a physical space, a buffer space, or a combination thereof occupied by the one or more physicals items. The apparatus is further caused to compute, by the one or more processors, a spatial footprint index for the user, the set of users, or a combination thereof based on the spatial data, wherein the spatial footprint index is a quantified representation of the physical space occupied by the one or more physical items. The apparatus is further caused to provide, by the one or more processors, the spatial footprint index as an output.

According to another embodiment, an apparatus comprises means for receiving, by one or more processors, information indicating that one or more physical items are associated with a user, a set of users, or a combination thereof. The apparatus also comprises means for determining, by the one or more processors, spatial data indicating a physical space occupied by the one or more physicals items. The apparatus further comprises means for computing, by the one or more processors, a spatial footprint index for the user, the set of users, or a combination thereof based on the spatial data, wherein the spatial footprint index is a quantified representation of the physical space occupied by the one or more physical items. The apparatus further comprises means for providing, by the one or more processors, the spatial footprint index as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes)

disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2 is an illustrative example of a spatial footprint index computation for a given person on a given day, according to example embodiment(s);

DESCRIPTION OF SOME EMBODIMENTS

Examples of a method, apparatus, and computer program for computing a spatial footprint index are disclosed. In the following description, for the purposes of explanation, numerous specific details are set forth to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form to avoid unnecessarily obscuring the embodiments of the invention.

Figure 1:
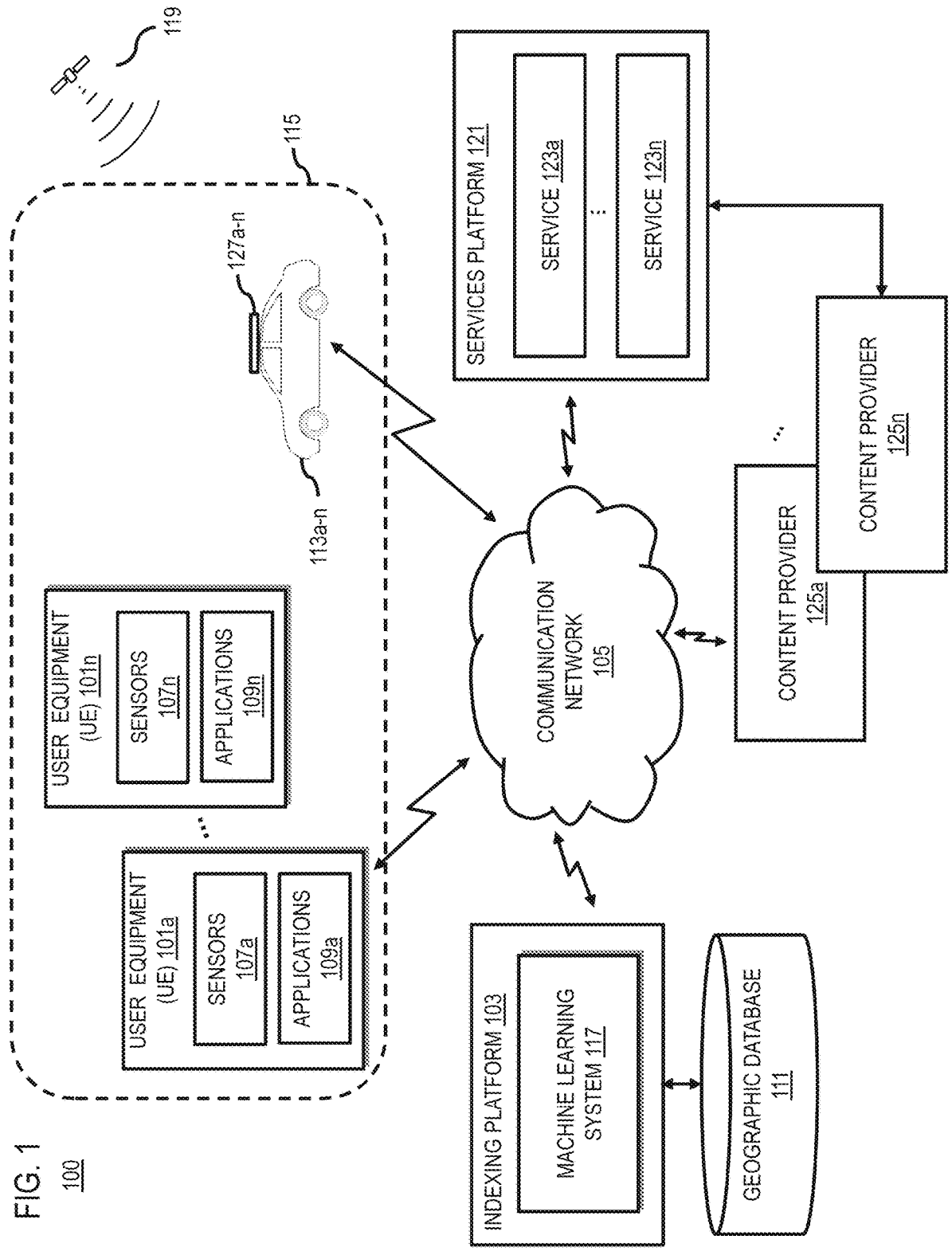
FIG. 1 is a diagram of a system capable of computing a spatial footprint index, according to example embodiment(s)

FIG. 1 is a diagram of a system capable of computing a spatial footprint index (e.g., for a user, a set of users, or a combination thereof), according to example embodiment(s). As described above, location-based service providers (e.g., mapping and navigation providers) are continually challenged to provide compelling services and applications. One area of development relates to human population modeling (e.g., respective densities, land use, changes over time, etc.). As human density increases over time (e.g., as models forecast), the availability of valuable public space may become scarce, particularly in urban areas, and the misuse and/or inefficient use of such space can have a detrimental impact on the society at large. For example, in areas with a relatively high degree of transient traffic and minimal available parking (e.g., a city center), it may be an inefficient use of public space if people to park their vehicles for long periods of time. If users (e.g., consumers) are aware of their respective spatial footprints, they may be more likely not to abuse public spaces and/or not use such spaces disproportionately relative to others. However, the dynamic nature of populations and the vast amount of relevant information required to compute spatial footprints for all users makes it difficult and costly for service providers to quickly and accurately provide such information before that information may become outdated and/or inaccurate (i.e., stale). Accordingly, service providers face significant technical challenges to enable users to be aware of their overall spatial footprint in a useful manner.

To address these technical problems, a system 100 of FIG. 1 introduces a capability to compute a spatial footprint index, according to example embodiment(s). In one embodiment, the system 100 can enable users (e.g., individuals, consumers, etc.) to be aware of their overall spatial footprint by computing the sum of their distributed footprints (directly and indirectly) through their belonging over time (e.g., an apartment, a parked vehicle, a table at a restaurant for 2 hours, etc.).

In one instance, the system 100 can gather data about a user's belongings (e.g., a house, a vehicle, furniture, etc.) in connection with a static allocation of the belongings. The system 100 can, for example, assign (manually or automatically) all the belongings to a specific user or a set of users (e.g., when one place/area/vehicle is shared by more than one user). In one embodiment, the system 100 can collect or receive data related to the belongings via one or more user equipment (UE) 101a-101n (also collectively or individual referred to as UEs 101 or a UE 101, respectively) (e.g., a mobile device, a smartphone, etc.) having connectivity to the indexing platform 103 via the communication network 105. In one embodiment, the UEs 101 include one or more device sensors 107a-107n (also collectively referred to as device sensors 107 (e.g., a camera sensor, a global positioning system (GPS) sensor, a light detection and ranging (LiDAR) sensor, etc.) and one or more applications 109a-109n (also collectively referred to as applications 109 (e.g., a camera-based application, a cataloging or indexing application, a navigation application, etc.). In one instance, the system 100 can also access data or information related to the belongings stored in or accessible via the geographic database 111.

In one instance, the system 100 can assign belongings to a specific user or a set of users in one or more of the following ways. For example, the system 100 can collect or receive data (e.g., geotagged data) via one or more photos or one or more scans of a belonging taken and/or transmitted via a UE 101 (e.g., a smartphone). In one instance, the system 100 can collect or receive the data directly from a UE 101 (e.g., via a camera-based application 107) or the system 100 may access data or information stored or accessible via the geographic database 111 (e.g., previously taken photos or scans). In another instance, a user can manually input (e.g., via a UE 101) an identification of their belongings along with item attributes (e.g., "I have a house with these dimensions at this address"). In one embodiment, the system 100 can collect or receive the data via a mapping application 107 (e.g., selecting a house, a car, a garden, etc. as shown in the application). For example, the mapping application 107 may include a satellite or aerial image the user can use to select one or more of her belongings. The system 100 can also, for example, collect or receive data, for example, based on a contemporaneous or past cataloguing or registration of a user's belongings (e.g., using a UE 101). In one instance, the system 100 can also collect or receive the data via a link or connection to a tax declaration or document (e.g., stored in or accessible via the geographic database 111). It should be noted that the system 100 can collect and process the data in a privacy compliant way (e.g., based on local privacy rules) to ensure user privacy, particularly since most of this data related to user's identity, movement, and belongings is highly sensitive.

In one instance, the system 100 can compute a buffer zone for one or more of the belongings or a user or set of users in connection with the static allocation. The system 100 can, for example, compute the relevant buffer zone based on available historical and/or observed data (e.g., stored in or accessible via the geographic database 111) suggesting that the presence of certain elements/objects/people (e.g., small children, a pregnant woman, a luxury vehicle, etc.) in the public space are often associated with a relatively larger than average buffer zone. The system 100 can also, for example, compute the relevant buffer zone based on a given area (e.g., the area 115). For example, social distancing norms may vary from place to place; however, in general, people often try not to be too close to each other in public space.

In one embodiment, if the system 100 determines that multiple individuals are at the same location sharing an item or belonging (e.g., an apartment, a vehicle, etc.), the system 100 can split the footprint allocation among the set of users. For example, the system 100 can distribute the allocation based on an even distribution of surface area (e.g., 120 meter squared (m2)/4 people=30 m2 (x the duration)). Alternatively, the system 100 can distribute the allocation based on one or more various contextual parameters (e.g., user age, ownership rights, or any relevant attribute). In one instance, the system 100 can take into consideration the types of surfaces, including bodies of water, which may have some relevant and/or specific characteristics in terms of public space (e.g., flood zones, value, crowding, density of point of interest (POI), sightseeing, etc.). In one embodiment, the system 100 can distribute the allocation based on volume as well as surface. For example, the system 100 can consider the height of the belongings, objects (e.g., apartment building), persons, etc.

In one instance, the system 100 can use probe data (e.g., via device sensors 107) to assign people to locations and, therefore, track users over time (e.g., in a privacy compliant manner). For example, the system 100 can perform the mapping between location and people using the probe data collected by UEs 101 (e.g., a mobile device, a smartphone, etc.) and other positioning or pairing techniques such as Bluetooth pairing with one or more vehicles 113a-113n (also collectively referred to as vehicles 113) (e.g., standard vehicles, autonomous vehicles, shared vehicles, etc.) have connectivity with the indexing platform 103 via the communication network 107 and traveling in a given area 115. In one instance, the system 100 can also track users and/or vehicles 113 in the given area 115 using beacons, Wi-Fi, geotagging of pictures, etc. In one instance, the probe data may be reported as probe points, which are individual data records collected at a point in time that records telemetry data for that point in time. A probe point can include attributes such as: (1) probe ID, (2) longitude, (3) latitude, (4) heading, (5) speed, and (6) time.

In one embodiment, the system 100 can gather data about a user's mobility patterns, transport modes used, etc. in connection with a dynamic allocation of the belongings. For example, when a person travels over public space, the "virtual space taken by this user" may depend on the density of people in the given area (i.e., the space which is "really" available for her). In one instance, the space allocated by the system 100 to a user walking in a forest (e.g., a buffer zone) might be 12.5 m2 (e.g., 2 m radius) while it may only be 0.78 m2 in a dense public transport station (e.g., a 0.5 m radius), which would be closer to the real available space for that user. In one instance, the system 100 can determine the applicable buffer zone based on historical data, averages, means, etc. stored in or accessible via the geographic database 111.

In one embodiment, the calculation of the spatial footprint based on human movement by the system 100 can include the system 100 tracking in time the user (e.g., via a UE 101), computing the relevant buffer zone based on the given context, and estimating the total footprint in "real time" or rather for each user movement. In one instance, the system 100 compute a different buffer zone for a vehicle 113 depending on whether it is moving or static (e.g., parked). In one instance, the system 100 can compute the size of the buffer zone relative to the speed of the movement of the item (e.g., the higher the speed of the vehicle, the larger buffer zone).

In one instance, the system 100 can consider an autonomous vehicles 113 as a particular type of shared vehicle 113 in terms of a static or a dynamic allocation and as such, the space occupied by an autonomous vehicle 113 may "count" only for the duration of the user's ride (and not during parking time) due to the ability of the vehicle 113 to go on its own after dropping off the user. The system 100 can, for example, determine the spatial footprint associated with the vehicle 113 based on the size of the vehicle 113 (e.g., the smaller the vehicle, the smaller the determined spatial footprint). In one embodiment, the system 100 can consider the travel required by the autonomous vehicle 113 to come and pick up a user as space occupied by the user, particularly if the vehicle 113 is traveling empty until this pickup point. In one instance, the system 100 can weight the space occupied based on the efficiency of use of the vehicle 113 (e.g., empty, reasonably occupied, completely occupied, etc.).

In one embodiment, the system 100 can compute a spatial footprint index based on the collected or received data concerning (1) the user's belongings; (2) the user's mobility patterns, transport modes used, etc.; and (3) additional contextual information (e.g., stored in or accessible via the geographic database 111). In one instance, the system 100 can compute a spatial index (e.g., using heuristics, rules, etc. or in some embodiments, the machine learning system 117) based on one or more of the following inputs that are provided by way of illustration and not limitation:

Information about a user, a user's belongings, and mobility patterns;
    Map data and attributes;
    Road attributes (width, size, directionality, etc.);
    Traffic data;

On street parking conditions (e.g., around delivery addresses);
Population model predictions;
Vehicles' sensors (proximity, etc.);
Weather;
Mobility graphs;
Parking restrictions;
On street parking availability from real-time parking street management systems;
Lane attributes;
Estimation of delivery vehicle parking time needed;
Known locations for emergency infrastructure (e.g., fire hydrants);
Nearby event data (e.g., street fairs, festivals, etc.);
Cost of street parking;
Etc.

In one instance, the system 100 can weight the computed spatial footprint index by or relative to the concentration of people in a given area 115 (e.g., the more crowded the space, the higher the weight), which also means the higher the incentive to park a vehicle 113 away from such areas. In one embodiment, the system 100 can use different indexes for each type of space (e.g., public, private, shared, etc.) as a weighting factor in determining a user's overall spatial footprint.

FIG. 2 is an illustrative example of a spatial footprint index computation for a given person on a given day, according to example embodiment(s). Referring to FIG. 2, the system 100 can compute the spatial footprint index for each item belonging to the user as well as the user as depicted in column 201 of the chart 200. In one embodiment, the system 100 can compute the spatial footprint index using the example formula shown in column 203 (e.g., "size*duration*context cost"). It should be noted that the formula depicted in column 203 is provided by way of illustration and not limitation. In this example, the respective size of each item or belonging is listed in column 205 and the static or dynamic nature of the space allocation is identified in column 207. In one instance, the system 100 can compute the spatial footprint index based on a duration (e.g., ownership, use, etc.) as well as on one or more context costs (e.g., population density, temporal factors, etc.) as depicted in column 203.

By way of example, the system 100 can compute the spatial index of the House 209 based on its size (e.g., 250 m2), a static allocation, and one or more other relevant contextual costs. For example, the system 100 can compute a relatively small buffer zone if the House 209 is located in a densely populated area and/or an area where the land value is relatively high (e.g., a city center) or the system 100 can compute a relatively large buffer zone if the House 209 is located in a sparsely populated area and/or an area where the land value is relatively low (e.g., a rural area). It is contemplated that there may be exceptions to such generalizations, for example, due to the presence of pollutants (e.g., in an urban area), rich natural resources (e.g., in a rural area), etc.

In another example, the system 100 can compute the spatial index of the Car 1 (211) based on its size (e.g., 8 m2), a static and dynamic allocation, and one or more relevant contextual factors (e.g., parking, temporal factors, etc.). For example, the system 100 can compute a relatively small spatial index for the Car 1 (211) if the user owns a private parking space versus if the user always parks the Car 1 (211) in a public parking space. Likewise, during certain types of weather or seasons (e.g., cold weather, winter), the system 100 can compute a relatively smaller spatial footprint for the Car 1 (211) given the fact that alternative means of transportation (e.g., walking, biking, etc.) may be less practical during inclement weather compared to warm weather, summer, etc.). Further, the system 100 can compute a buffer zone that changes depending on whether the Car 1 (211) is parked (static) or moving (dynamic). For example, the system 100 can compute an increasingly greater buffer zone based on the increasing speed of the Car 1 (211) (e.g., for safety purposes).

In one example, the system 100 can compute a relatively large overall spatial footprint index for a user that has more than one belonging in a category (e.g., a House 209 and a Summer Home 213 or a Car 1 (211) and a Car 2 (215)). In one instance, the system 100 can compute the spatial footprint index of the Bike 217 based on the number of user and/or duration of uses during a temporal period (e.g., a year, a week, a day, etc.). The system 100 can, for example, compute the spatial footprint index of the user 219 based on the user's size as well as the user's movement in relation to the given area (e.g., in a densely populated or crowded area or a sparsely populated area, etc.).

In one embodiment, the system 100 can present the overall spatial footprint index as an output to the user (e.g., via a mapping application 109) with insights and recommendations on how to reduce this footprint. In one example, the system 100 can list all the belongings of the user in ranked order relative to their respective spatial footprint so that the user can see which of the belongings has the highest footprint. For example, a secondary home or apartment may have a high spatial footprint, which could be reduced by offering it to other people (e.g., either from the family or externally to a third-party). It is contemplated that in this context, the duration for which such secondary home or apartment is assigned to someone other than the owner or primary users would reduce the user's spatial footprint for that duration. In one example, the system 100 can determine that a user is traveling in a large vehicle 113 across the city in a relatively inefficient manner and, therefore, the system 100 can recommend to the user to make the vehicle 113 available for carpooling to reduce the spatial footprint associated with the vehicle 113 and/or the user. In one embodiment, the system 100 can recommend carpooling to the user and can also match the candidate with the vehicle 113. In another example, if the system 100 determines that the user needs to remain in a relatively densely populated area for a relatively long period (e.g., a city center for 8 hours), but does not need to carry anything on the way home, the system 100 can determine that the spatial footprint of a shared vehicle 113 (e.g., a taxi) would be lower relative to a personal vehicle 113 due to the ability to avoid parking, a bike or public transport being even lower. In this case, the system 100 can recommend to the user an alternative transport mode (e.g., a shared vehicle 113).

In one instance, the system 100 can generate and/or render one or more recommendations for reducing the calculated overall spatial footprint index. For example, a user can reduce the number of belongings with a high spatial footprint; discard belongings that occupy a relatively large amount of space and are infrequently used; share belonging with a high spatial footprint with other people; and/or park vehicles 113 in areas where its spatial footprint would be lower (e.g., parking one or two blocks away from a city center). The basic idea being that people should not abuse valuable public space and not use space disproportionally. Being aware of one's spatial footprint index may make people better appreciate the value of space and also realize what their real footprint is and possibly help change behaviors (e.g., by reducing their respective footprints).

In one embodiment, the system 100 can use the overall spatial footprint index to recommend to a user the optimal location to go to accomplish a given task (e.g., food shopping) while keeping the spatial index as limited as possible. For example, the system 100 can recommend to a user that going shopping in the given area 115 would be best for your "end to end spatial index" (e.g., traveling to, parking, time spent shopping, and traveling back). In one instance, the system 100 can recommend to a user (e.g., via a mapping application 107) specific times to visit certain places to optimize their spatial footprint. For example, a user can minimize her overall spatial footprint index by reducing the total time spent at a location (e.g., a POI such as a museum) by going when the crowds are relatively low on average (e.g., based on data or information stored in or accessible via the geographic database 111).

In one instance, the system 100 can monitor the evolution of a user's spatial index over time and compare it with other users. For example, the system 100 can present to a user her overall spatial footprint index (e.g., via belongings spatial application 107) relative to other users based on one or more contextual parameters (e.g., demographics, location, age, etc.). In one instance, the system 100 can determine a change in user's usage of a belonging (e.g., in response to a recommendation, a comparison with another user, etc.). For example, the system 100 can determine that a user started sharing her vehicle 113 with other individuals, thereby reducing the user's overall spatial footprint index.

Figure 3:
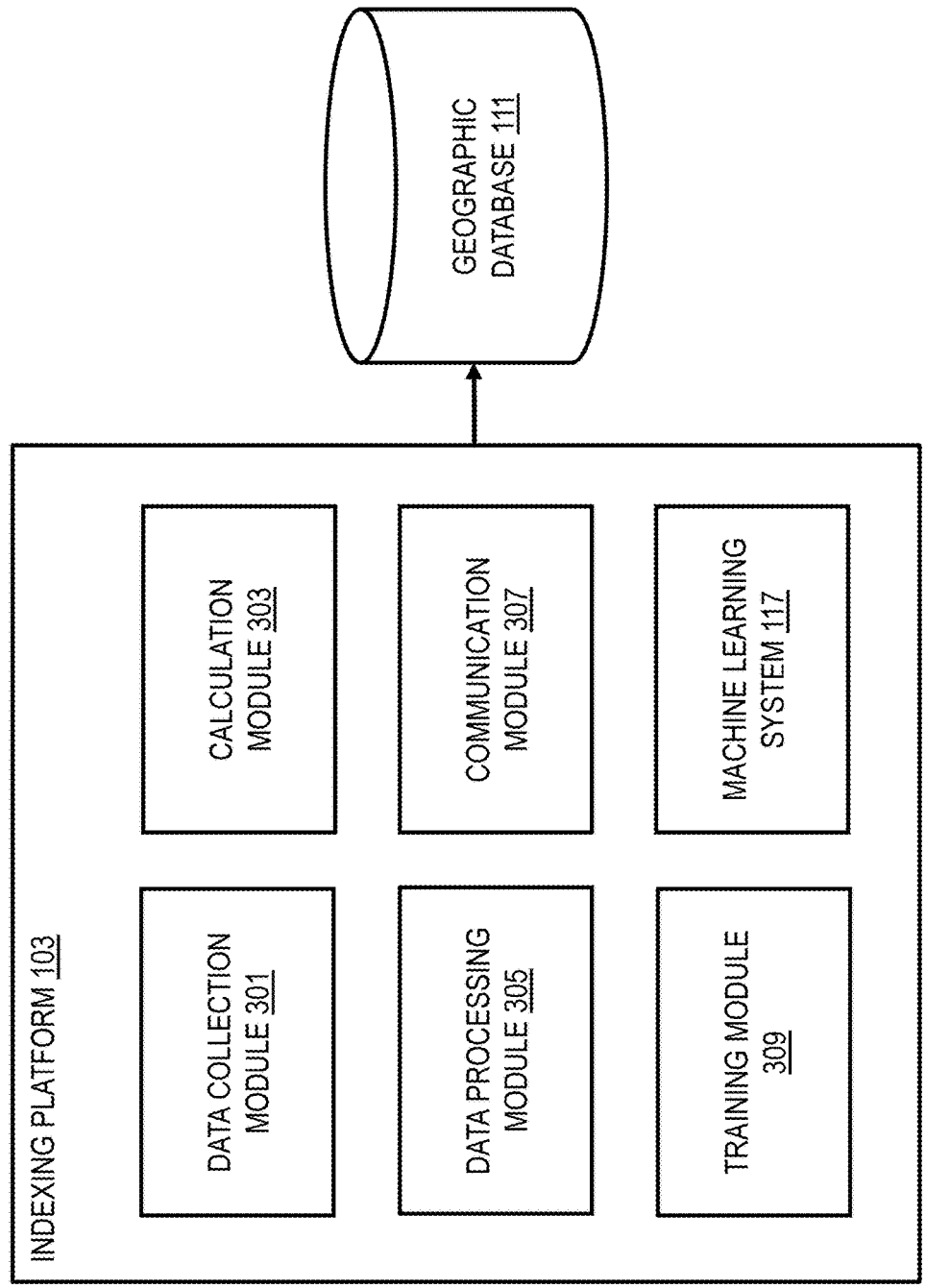
FIG. 3 is a diagram of the components of a indexing platform, according to example embodiment(s)

FIG. 3 is a diagram of the components of the indexing platform 103, according to example embodiment(s). By way of example, the indexing platform 103 includes one or more components for computing a spatial footprint index, according to the example embodiment(s) described herein. It is contemplated that the functions of these components may be combined or performed by other components of equivalent functionality. In one embodiment, the indexing platform 103 includes a data collection module 301, a calculation module 303, a data processing module 305, a communication module 307, a training module 309, and the machine learning system 117, and has connectivity to the geographic database 111. The above presented modules and components of the indexing platform 103 can be implemented in hardware, firmware, software, or a combination thereof. Though depicted as a separate entity in FIG. 1, it is contemplated that the indexing platform 103 may be implemented as a module of any other component of the system 100. In another embodiment, the indexing platform 103, the machine learning system 117, and/or the modules 301-309 may be implemented as a cloud-based service, local service, native application, or combination thereof. The functions of the indexing platform 103, the machine learning system 117, and/or the modules 301-309 are discussed with respect to FIG. 4.

Figure 4:
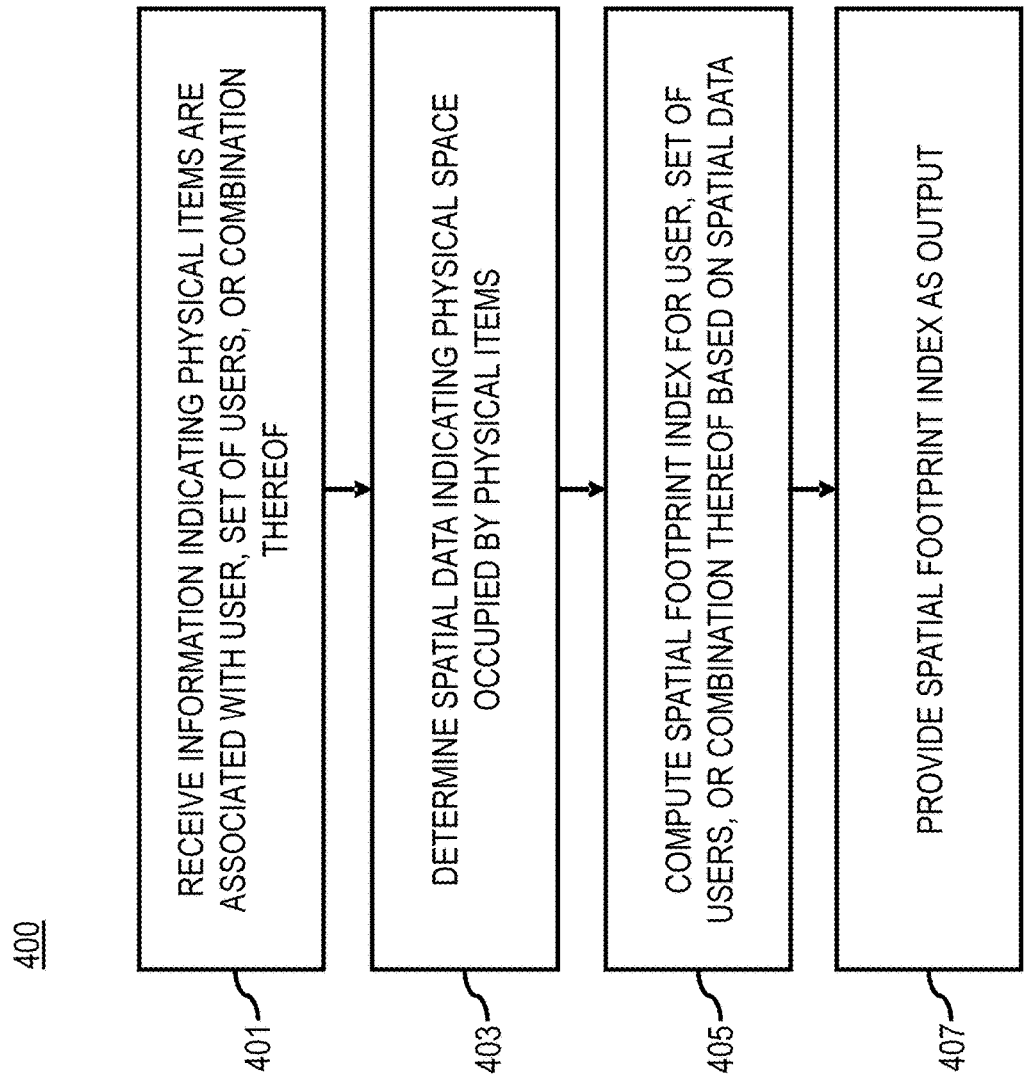
FIG. 4 is a flowchart of a process for computing a spatial footprint index, according to example embodiment(s)
Figure 8:
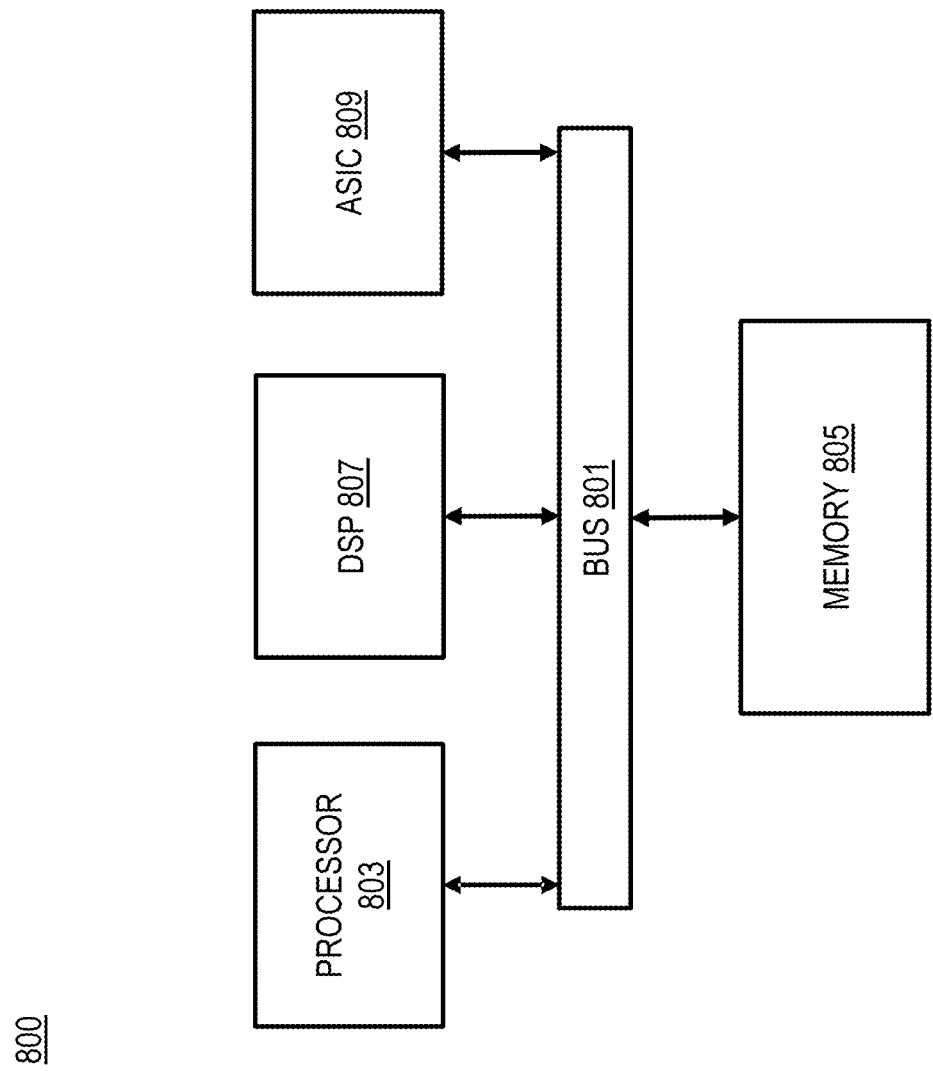
FIG. 8 is a diagram of a chip set that can be used to implement example embodiment(s)

FIG. 4 is a flowchart of a process for computing a spatial footprint index, according to example embodiment(s). In various embodiments, the indexing platform 103, the machine learning system 117, and/or any of the modules 301-309 may perform one or more portions of the process 400 and may be implemented in, for instance, a chip set including a processor and a memory as shown in FIG. 8. As such, the indexing platform 103, the machine learning system 117, and/or the modules 301-309 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all the illustrated steps.

In step 401, the data collection module 301 can receive, by one or more processors, information indicating that one or more physical items are associated with a user, a set of users, or a combination thereof. In one instance, the data collection module 301 can receive information by gathering or collecting data from the UEs 101 (e.g., a mobile device, a smartphone, etc.) and/or a the vehicles 113 (e.g., an autonomous vehicle) stored in or accessible via the geographic data 111, or a combination thereof. The receipt of the information indicating an association by the data collection module 301 is important because the calculation module 303 can use this information to determine the overall spatial footprint of a user by computing the sum of the user's distributed footprints (directly and indirectly) through her belongings (such as a house, vehicle 113) over time. Thus, it is important for the data collection module 301 to receive information as to which belongings belong to which one or more users.

In one instance, the information received by the data collection module 301 can be based on an assignment by the data processing module 305 of one or more physical items to a user, a set of users, or a combination thereof. In one embodiment, the data processing module 305 can manually or automatically assign the physical items to users, for example, based on a photograph or a scan of an item (e.g., a geotagged photograph), a manual input by a user (e.g., via a UE 101 such as a smartphone), an entry in the geographic database 111, etc.

In one instance, the one or more physical items may be any physical objects, items, or belongings that occupy a physical space in a given area (e.g., the area 115) such as a house, a building, a vehicle 113, household items (e.g., furniture, clothing, etc.), a table at a restaurant, one or more seats at a sport or entertainment venue, etc.

In one embodiment, the one or more physical items (e.g., a house, a car, a bike, etc.) are associated with a user, a set of users, or a combination thereof based on a static allocation indicating an ownership, a dynamic allocation indicating a duration of use or movement, or a combination thereof. In one instance, the determined association or allocation can be important because it can be used by the calculation module 303 as a weighting factor in determining a ranked order of the spatial footprints of each item belonging to a user and/or in determining the overall spatial footprint index of all belongings. By way of example, the calculation module 303 can compute a certain spatial footprint for a car (e.g., a vehicle 113) based on a dynamic allocation. For example, the calculation module 303 can determine one or more spatial footprints for the car when it is parked (e.g., in a private parking space, a public parking space, illegally parked, etc.) and the calculation module 303 can determine one or more other spatial footprints for the car when it is traveling in or through a given area (e.g., the area 115). For the example, the calculation module 303 can compute the one or more other spatial footprints based on the crowdedness of the area, the number of passengers in the car, the purpose of the travel (e.g., business, recreation, emergency, etc.), the speed at which the car is traveling, etc.

In one instance, a set of users may comprise two or more users that the data collection module 301 can determine are at the same location with a particular temporal frequency (e.g., based on probe data). For example, the two or more users may be attendees at a party, they may be roommates sharing an apartment, tenants of the same apartment building, etc. In one instance, the data collection module 301 can also determine that the set of users comprises two or more users sharing one or more vehicles 113. For example, the users may be simultaneously sharing a vehicle 113 (e.g., a shared vehicle) on a trip to a concert or the users may be independently sharing a vehicle 113 (e.g., an autonomous vehicle) in connection with respective trips, days of the week, etc. In another example, the data collection module 301 can determine that a restaurant table is associated with a set of users over the course of a day, week, month, etc. when determining the spatial footprint of the table.

In step 403, the data processing module 305 can determine, by the one or more processors, spatial data indicating a physical space occupied by the one or more physicals items (e.g., a house, a vehicle 113, etc.). In one embodiment, the spatial data includes at least one of: the physical space occupied directly by one or more physicals items, a user, a set of users, or a combination thereof; or the physical space occupied indirectly by one or more physicals items, a user, a set of users, or a combination thereof by incorporating a buffer space around the one or more physicals items, the user, the set of users, or a combination thereof.

In one instance, the data processing module 305 can determine the physical space occupied directly by one or more physical items based on its specific dimensions (e.g., stored in or accessible via the geographic database 111). For example, the data processing module 305 can determine that the physical space occupied directly by Car 1 (211) of FIG. 2 is 8 m2 and the physical space occupied directly by the House 209 is 250 m2. In one instance, the physical space occupied directly the one or more physical items may be based on an average, an approximation, a mean value, etc. For example, the physical space may be approximated by the data processing module 305 based on a general description (e.g., a four-door sedan, a one-bedroom apartment, a table, etc.) without knowing the specific dimensions for that exact item or belonging.

In one embodiment, the data processing module 305 can determine the physical space occupied indirectly (e.g., a buffer space) based on information or data stored in or accessible via the geographic database 111 as well as a determined context of the physicals items, the user, the set of users (e.g., allocation or activity based on probe data). For example, the data processing module 305 can determine that an individual has a greater buffer space when walking in a relative less crowded area (e.g., a forest) compared to when the user is walking in a relatively more crowded area (e.g., a city center). In one instance, the data processing module 305 can determine the applicable buffer zone for the user or the set of users based on the given area where the users are located (e.g., area 115). In one instance, the data processing module 305 can determine that a vehicle 113 has a greater buffer space when traveling at high speed compared to when the vehicle 113 is parked. In one embodiment, the data processing module 305 can also take into consideration the type of vehicle 113 in determining the buffer space (e.g., an autonomous vehicle, a standard vehicle, a used vehicle, a luxury vehicle, etc.).

In step 405, the calculation module 303 can compute, by one or more processors, a spatial footprint index for a user, a set of users, or a combination thereof based on spatial data, wherein the spatial footprint index is a quantified representation of the physical space occupied by the one or more physical items. In one instance, the calculation module 303 can compute the spatial footprint index such that the quantified representation represents the sum of the user's distributed footprints (directly and indirectly) through the one or more physical items that are associated with the user, the set of users, or a combination thereof over time.

In one embodiment, the data collection module 301 can determine, by one or more processors, mobility pattern data indicating a movement of one or more physical items, a user, a set of users, or a combination thereof, wherein the spatial data, the spatial footprint index, or a combination thereof is further based on the mobility pattern data. In one instance, the mobility pattern data may be based on a duration of such movement, a context of such movement, or a combination thereof. By way of example, the data collection module 301 can determine the current or relatively recent movement of the one or more physical items based on geotagged images of the one or more physical items, user input (e.g., via a UE 101 such as a smart phone), etc. In one instance, the data collection module 301 can determine the movement of a user, a set of users, or a combination thereof based on probe or sensor data via the UEs 101, the vehicles 113, or a combination thereof associated with the user, the set of users, or a combination thereof. In one embodiment, the calculation module 303 can determine a relative increase in respective spatial data and/or the overall spatial footprint index when one or more physical items, the user, the set of users, or a combination thereof are in movement. For example, the data processing module 305 can determine a relatively larger buffer space based on the movement, thereby increasing the spatial footprint index.

In one instance, the mobility pattern data can indicate a mode of transport, and wherein the spatial data, the spatial footprint index, or a combination thereof can further be based on the mode of transport. For example, the mode of transport may be a public vehicle 113 (e.g., a bus, a subway, a train, etc.), a private vehicle 113 (e.g., a standard vehicle, an autonomous vehicle, a semi-autonomous vehicle, a bike, etc.), a shared vehicle 113 (e.g., a shared car, a shared bike, a shared scooter, etc.). In one embodiment, the calculation module 303 can calculate the spatial data and/or the spatial footprint index based on a determination of the impact the particular mode of transport may have on the relative public space and/or the proportionate use of public space. For example, the calculation module 303 can calculate the spatial data and/or spatial footprint index based on historical and/or observed data stored in or accessible via the geographic database 111.

In embodiment, the calculation module 303 can determine a duration associated with a use of one or more physical items, a travel by a user or a set of users, or a combination thereof, wherein the spatial footprint index is further based on the duration. In one instance, the calculation module 303 can determine the duration of a user's use of a belonging (e.g., based on probe data). For example, the calculation module 303 can compute a reduction in the spatial data associated with one or more physical belongings (e.g., a vehicle 113, an apartment, etc.) and/or the overall spatial footprint index of the user based on the user sharing the one or more belongings with other users.

In one instance, the calculation module 303 can determine a duration of a user's travels. For example, the calculation module 303 can increase the spatial data associated with a vehicle 113 that might not be optimal for a particular trip and/or the overall spatial footprint index (e.g., taking a large car for a short trip). Conversely, the calculation module 303 can compute a reduction in the overall spatial index of a user based on a longer than average duration of the trip (e.g., using a bike to travel a longer than normal distance rather than taking a vehicle 113). In some instances, the calculation module 303 can consider the duration associated with the use of the one or more physical items, the travel by the user or the set of users, or a combination thereof in terms of a user's effort not to abuse valuable public space and not use the space disproportionally.

In one embodiment, the data processing module 305 can determine a context associated with a use of one or more physical items, a travel by a user or a set of users, or a combination thereof, wherein the spatial footprint index is further based on the context. In one instance, the data processing module 305 can determine the context based on the crowdedness of the location of the user, the one or more physical items, or a combination thereof. In one instance, the calculation module 303 can weight, by one or more processors, the spatial footprint index based on the population density of the place (e.g., based on information or data stored in or accessible via the geographic database 111). For example, the spatial data of a vehicle 113 used in a relatively crowded area (e.g., a city center) may be weighted relatively heavier than the vehicle 113 used in a relatively uncrowded area. In another instance, the data processing module 305 can compute a reduction in the weight of a vehicle 113 where the user parks the vehicle 113 outside of a relatively crowded area (e.g., within walking distance). In one instance, the data processing module 305 can determine a relatively greater spatial footprint index based on the various determined buffer zones corresponding to a context of a user, one or more physical items, or a combination thereof.

In one instance, the calculation module 303 can weight the spatial footprint index based on a population density of a place (e.g., the given area 115). In one instance, the data collection module 301 can determine the population density of a place based, for example, on probe data, census data, mobility patterns data, etc. stored in or accessible via the geographic database 111. In one example, the calculation module 303 can weight the spatial footprint index such that the weight relative to a user is relatively greater in relatively more crowded spaces since the basic idea is that people should not abuse valuable public space and not use space disproportionally. In one embodiment, the calculation module 303 can also weight the respective spatial data. For example, the calculation module 303 can determine (e.g., based on information or data stored in or accessible the geographic database 111) that if a vehicle 113 is shared among multiple users, it may have a relatively lower calculated weight than the same vehicle 113 that is used by only one person. In other words, the calculation module 303 can "discount" the spatial data of the shared vehicle 113 in connection with the summation of all spatial data to compute the spatial footprint index for a user, a set of users, or a combination thereof.

In another example, the calculation module 303 can assign greater weight to a vehicle 113 that exceeds the minimal requirements for a task, particularly when or where the user has an alternative means of transportation. For example, in the case where the user takes a large vehicle 113 (e.g., a SUV) on a short trip when taking a small vehicle 113 (e.g., a bike or scooter) would have required relatively similar time and effort, the calculation module 303 can assign a greater weight to the large vehicle 113 than normally would be assigned. As such, the user's computed spatial footprint index would be relatively increased as well. In one embodiment, the calculation module 303 can calculate the spatial footprint index such that the quantified representation is based on an equal distribution of the spatial data among a set of users or the quantified representation may be based on an uneven or proportionate distribution. For example, the calculation module 303 can take into consideration age or ownership rights of the respective users of the set or any other relevant attribute.

In one embodiment, the training module 309 in connection with the machine learning system 117 can select respective weights for the weighting of the one or more physical items, the corresponding spatial data, or a combination thereof associated with a user, a set of users, or a combination thereof. In one instance, the training module 309 can train the machine learning system 117 to select or assign respective weights, correlations, relationships, etc. among the one or more physical items, the user, the set of users, or a combination thereof based on one or more of the following: (1) the movement of one or more physical items, a user, a set of users, or a combination thereof; (2) the duration associated with a use of the one or more physical items, a travel by the user or the set of users, or a combination thereof; or (3) the context associated with the user of the one or more physical items, the travel by the user or the set of users, or a combination thereof, wherein the spatial footprint index is calculated by the calculation module 303 based on the respective weights. In one instance, the training module 309 can continuously provide and/or update a machine learning module (e.g., a support vector machine (SVM), neural network, decision tree, etc.) of the machine learning system 117 during training using, for instance, supervised deep convolution networks or equivalents. In other words, the training module 309 can train a machine learning module using the respective weights of the one or more physical items to most effectively calculate the spatial footprint index of the user, the set of users, or a combination thereof. In one embodiment, the training module 309 can also train the machine learning system 117 to compute the relevant buffer zone in relation to the movement of a user, a set of users, or a combination thereof so that the calculation module 303 in connection with the machine learning system 117 can compute the relevant buffer zone based on the given context and compute the spatial footprint index in "real time" or rather for every moment.

In step 407, the communication module 307 can provide, by one or more processors, the spatial footprint index as an output. In embodiment, the output can be a user interface (e.g., a mapping application 107, an inventory application 107, etc.) representing the spatial footprint index, the spatial data, or a combination thereof. In one embodiment, the data processing module 305 can determine, by one or more processors, a recommended use of the one or more physical items (e.g., stored in or accessible via the geographic database 111) based on the spatial footprint index, wherein the recommended use is selected to reduce the spatial footprint index, and wherein the output comprises the recommended use. By way of example, the recommendation is intended to enable a user to optimize her spatial footprint index and to raise awareness and promote a more sustainable world based on population growth predictions. In one instance, the recommended uses may include at least one of the following: (1) reducing the one or more physical items associated with the spatial footprint index above a threshold value (e.g., based on a ranked list); (2) getting rid of one or more physical items; (3) sharing a use of the one or more physical items with at least one other user, giving up the one or more physical items, or a combination thereof; or (4) moving the one or more physical items to areas associated with a reduced weighting of the spatial footprint index. For example, the recommendation (e.g., via a mapping application 107) can suggest that a user can park her vehicle 113 a short walk away from its current location, where there is a lower density of people (i.e., less crowded) to reduce the weighting of the spatial data associated with the vehicle 113 and, therefore, reduce the spatial footprint index of the user.

In one embodiment, the recommended use (e.g., provided by the communication module 307) can relate to using one or more physical items (e.g., a vehicle 113) to transport a user, a set of users, or a combination thereof to a given place. By way of example, the data collection module 301 can determine (e.g., based on probe data) that a user is traveling in a large vehicle 113 (e.g., a SUV) across the given area 115 and that this vehicle 113 may not be the optimal option in this context (e.g., not requiring the relatively large cargo space to transport items). Thus, the communication module 307 in connection with the data processing module 305 can recommend to the user (e.g., via the mapping application 107) that the user take someone (and actually do the matching with a candidate) for carpooling. In another example, if the data collection module 301 determines that the user will need to remain parked in a relatively densely populated area for a relatively long period (e.g., the city center for 8 hours) and does not need to carry something on the way home (e.g., based on a calendar application 107 entry, data stored in or accessible via the geographic database 111, etc.), then the calculation module 303 can determine that the spatial footprint of a shared vehicle 113 (e.g., a taxi) would be relatively lower since no parking will be required, a vehicle 113 such as a bike or public transport being even lower. In this case, the communication module 307 can provide a recommendation of an alternative transport mode (e.g., via the navigation application 107).

In one embodiment, the data processing module 305 can determine, by one or more processors, a recommended context for a recommended use to reduce the spatial footprint index. In one instance, the recommended context can include a recommended place, a recommended time, or a combination thereof for the recommended use. In one instance, the data processing module 305 can determine the optimal location to go to accomplish a task, while keeping the spatial index as limited as possible. The optimal location may be, for example, a location where the crowds are on average relatively minimal (e.g., based on historic mobility charts stored in or accessible via the geographic database 111). By way of example, the recommendation provided by the communication module 307 (e.g., via the navigation application 107) may state "shopping at location x would be best for your 'end to end spatial index.'" In this example, the "end to end spatial index" may represent the spatial index for the user traveling to the shopping location, possibly parking there, spending time shopping, and then returning to the original location. In one instance, the data processing module 305 could also recommend (e.g., via the mapping application 107) that the user visit places only at specific times to optimize their spatial footprints (e.g., based on historic mobility charts).

In one instance, the data collection module 301 can monitor, by one or more processors, an evolution of the spatial footprint index over a period of time and the communication module 307 can provide, by the one or more processors, the monitoring as another output. In one instance, the communication module 307 can provide the evolution of the spatial footprint index over a period of time as another output so that a user may understand how following or not following the recommendations of the data processing module 305 can relatively decrease or increase the spatial footprint index. In one embodiment, the data collection module 301 in connection with the communication module 307 can provide the training module 309 with the monitored spatial data to better ensure that the training module 309 is training the machine learning system 117 using the most up-to-date (e.g., real time) data and information.

In one embodiment, the communication module 307 in connection with the data processing module 305 can provide the another output as a comparison of the spatial footprint index of the user against the spatial footprint index of one or more other users. For example, the one or more other users may be based one or more relationship parameters, one or more demographic parameters, one or more geographic parameters, or any parameters (e.g., stored in or accessed via the geographic database 111) that may prove useful for comparing the spatial footprint indexes. In one instance, the data processing module 305 can access spatial data based on a particular one or more physical items so that a user may learn one or more tips for lowering its spatial footprint. For example, users that use energy intensive items (e.g., a washer and dryer, dishwasher, etc.) during peak hours may have a greater spatial footprint index compared to users that use such physical items during non-peak hours. It should be noted that the comparison is not intended to blame or make people feel guilty but rather to raise awareness.

FIGS. 5A through 5E are diagrams of example user interfaces capable of computing a spatial footprint index, according to example embodiment(s). In one use case example, a user (e.g., an individual) may be moving from a relatively sparsely populated area (e.g., a city suburb or a rural area) where people have more space for storage to a relatively densely populated area (e.g., a city center) and wants to have a better understanding or appreciation of her spatial footprint index, particularly the spatial data associated with each of her belongings to determine whether there are any items that are not used and/or not used efficiently such that they may be candidates for discarding or using in a more efficient manner ahead of the move. For example, the more items that need to be moved, the more expensive the move may be. It is contemplated that a user may want to know this information even if they were not moving (e.g., based on curiosity and/or responsible management) and in some instances a user may want to know this information in real time.

Figure 5A:
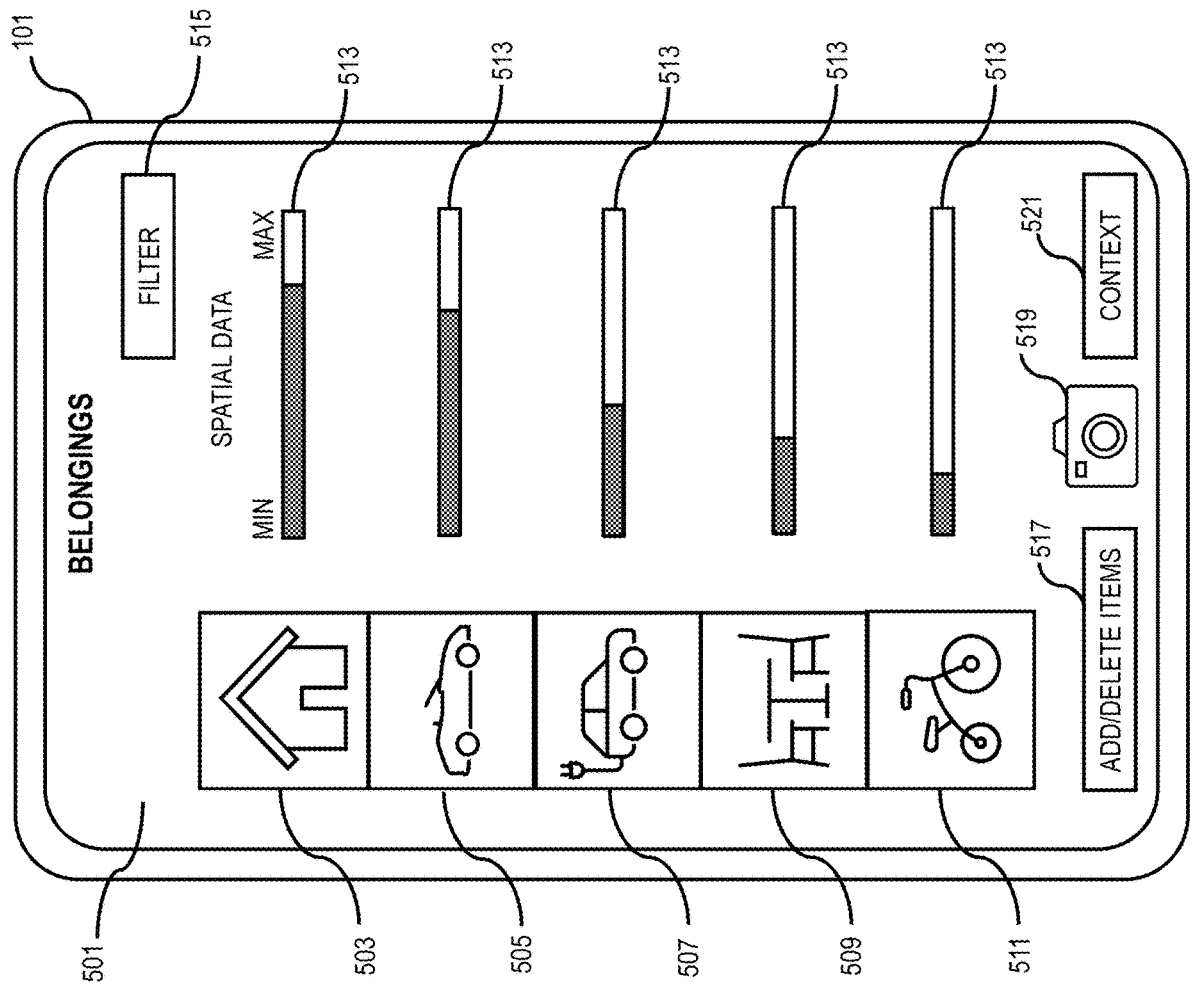
FIGS. 5A through 5E are diagrams of example user interfaces capable of computing a spatial footprint index, according to example embodiment(s)

Referring to FIG. 5A ("Belongings"), in one embodiment, the system 100 can generate a user interface (UI) 501 (e.g., an inventory application 109, a navigation application 109, etc.) for a UE 101 (e.g., a mobile device, a smartphone, a client terminal, etc.) that can enable a user (e.g., an individual, a software developer, etc.) to view her spatial footprint index, spatial data, or a combination thereof. In this instance, the system 100 can generate the UI 501 such that is provides the user at least a partial list of the user's belongings (503-511). For example, the system 100 can determine (e.g., based on data stored in or accessible via the geographic database 111) that the user currently owns or is using a house 503, a sports car 505, an electric vehicle 507, a table and chair set 509, and a bicycle 511. In this example, the spatial data for each item (e.g., based on the physical space occupied directly (e.g., dimensions), the physical space occupied indirectly (e.g., buffer space), the current location and/or context, etc.) is represented as a spatial data graph 513 (e.g., "min" and "max") adjacent to each of the user's items. In one embodiment, the system 100 can generate the UI 501 such that it includes an input 515 (e.g., "filter") to enable the user to filter or to arrange the presentation of the items 503-511 in the UI 501 in one or more different ways based on user preference or inquiry. For example, the user can select to view the items 503-511 in a ranked order according to their respective contributions to the user's overall spatial footprint index, as depicted by the respective spatial data graphs 513.

In one embodiment, the system 100 can generate the UI 501 such that the items 503-511 each include a corresponding input 503-511 that can enable a user to obtain more specific information about an item and/or about the factors that make up the determined spatial data for an item (e.g., size, duration, context cost, etc.) through on one or more interactions with input 503-511. In one instance, the one or more interactions may include one or more physical interactions (e.g., a touch, a tap, a gesture, typing, etc.), one or more voice commands, or a combination thereof. In one instance, the system 100 can generate the UI 501 such that the UI 501 can provide a user with one or more audio cues or audible feedback in response to the one or more interactions. In one embodiment, the system 100 can generate all the inputs described with respect to FIGS. 5A-5E such that they all have the same functionality in terms of user interaction/operability.

In one instance, the system 100 can generate the UI 501 with an input 517 (e.g., "add/delete items") to enable a user to add or delete one or more physical items (e.g., by typing an item's name or description) to be factored into the user's overall spatial footprint index by the system 100. In one instance, the system 100 can generate the UI 501 such that it includes an input 519 (e.g., a "camera icon") to enable the user to activate and/or use one or more device sensors 107 (e.g., camera sensors, LiDAR sensors, etc.) associated with the UI 101 (e.g., a smartphone) and/or applications 109 to manually or automatically add or assign a particular item to the user. For example, the user can use the input 519 to photograph an item (e.g., with geotagged information) or to scan a barcode or a quick response (QR) code on or associated with an item (if available). In one instance, the system 100 can match the one or more photographs or scans against data or information stored in or accessible via the geographic database 111 to determine the corresponding spatial data for the item.

In one embodiment, the system 100 can generate the UI 501 such that it includes an input 521 (e.g., "context") to enable the user to input a particular location or context for the system 100 to use to determine the spatial data for a particular item. In one instance, the system 100 can generate the UI 501 such that it uses the user's current location (e.g., area 115) by default, but can enable the user to change either her location or the location of one or more items, which can also change the weighting of a particular item by the system 100 and/or the overall spatial footprint index of the user. For example, the user may want to change the parking location of the vehicle 505 from a public space to a private space to reduce its spatial data, particularly in a densely populated area. Likewise, the user may want to see what her spatial footprint index would be if she had all the items in her current location at another location.

Figure 5B:
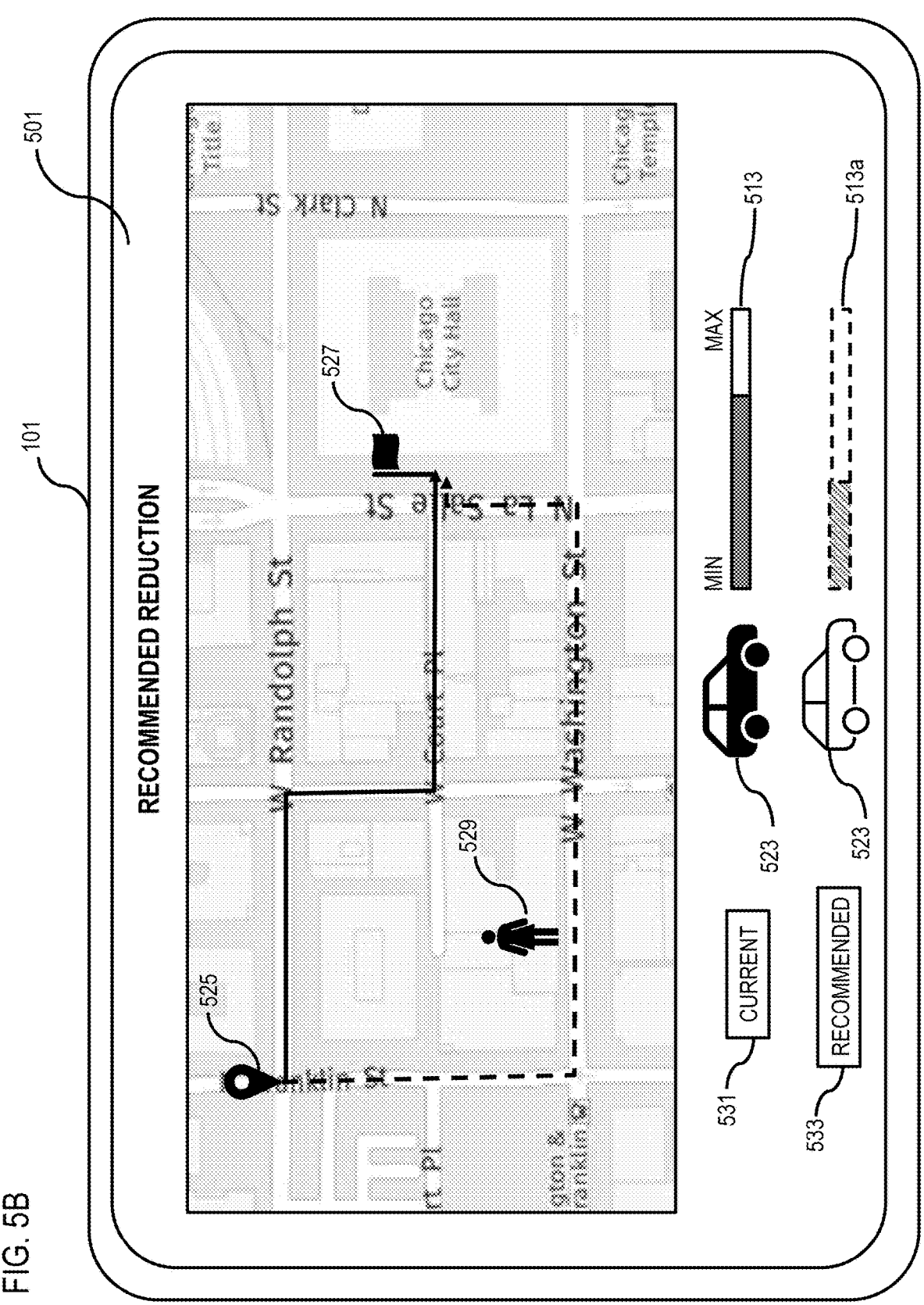

Referring to FIG. 5B ("Recommended Reduction"), in one embodiment, the system 100 can generate the UI 501 such that it can provide the user with one or more recommendations to reduce the spatial footprint of an item (e.g., vehicle 523) and/or the user's overall spatial footprint index given a particular context (e.g., traveling). In this example, the user may want to travel (e.g., using the vehicle 523) between an origin 525 (e.g., a home or office) and a destination 527 (e.g., city hall). In one instance, the system 100 can generate the UI 501 such that it provides the user with the spatial data graph 513 for the vehicle 523 based on her "current" or default mode of transport as well as the spatial data graph 513a for the vehicle 523 based on the "recommended" mode of transport. In this example, the system 100 can determine that there are one or more other users 529 (e.g., a matched candidate) that are in need of a ride to the same or similar location 527 and that the user would only be slightly inconvenienced to carpool with this individual and that by doing so the user can reduce the spatial data associated with the vehicle 523 by nearly half. In one embodiment, the user can select to travel using the current route or can select to travel using the recommended route via the inputs 531 and 533, respectively. For example, if the user selects the recommended route, the system 100 can notify the individual 529 when the user will pick them up (e.g., approximately).

Figure 5C:
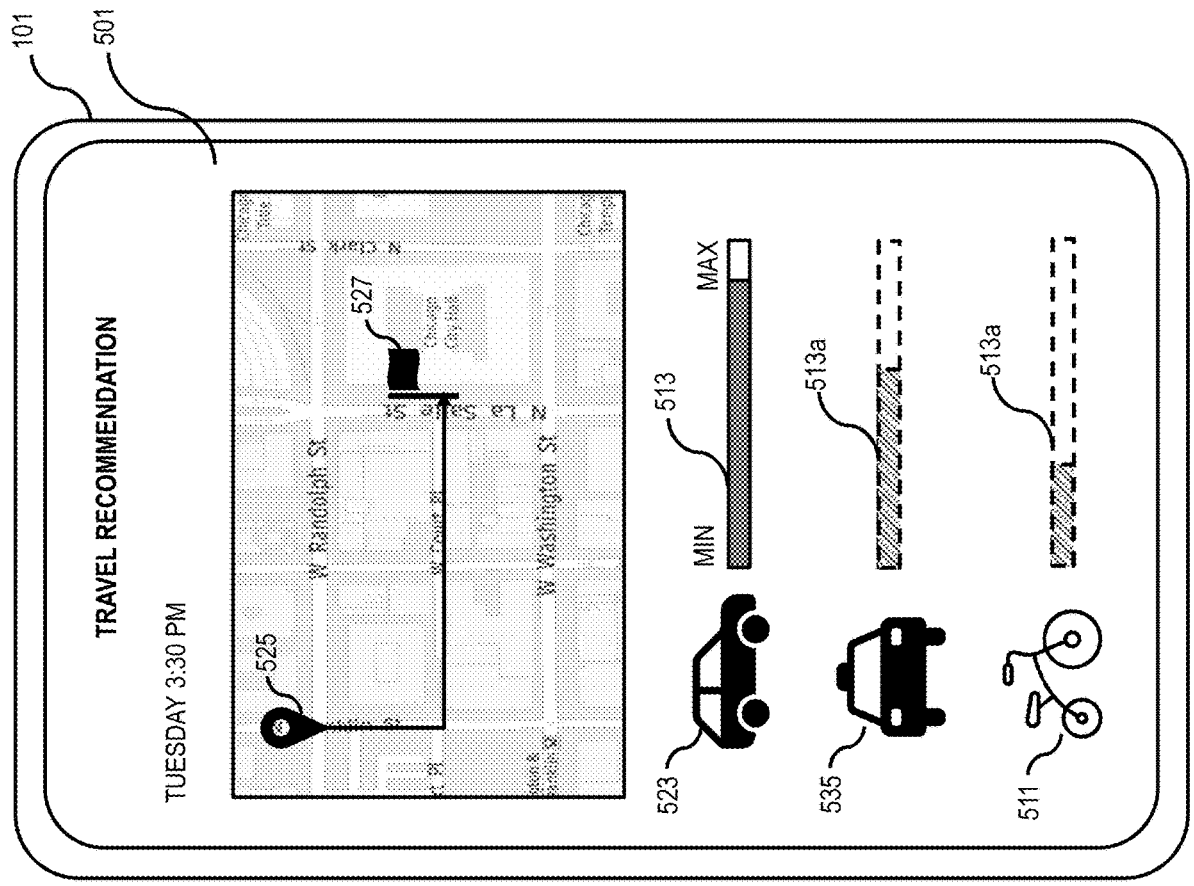

Referring to FIG. 5C ("Travel Recommendation"), in one embodiment, the system 100 can generate the UI 501 such that it can recommend one or more alternative transport modes to a user to accomplish a particular task (e.g., traveling between POIs). Following the example of FIG. 5B, the system 100 can determine that the user is attempting to travel between the origin 525 (e.g., home, work, etc.) and the destination 527 (e.g., city hall) using the vehicle 523 and will likely need a few hours at the destination 527 to accomplish this task (e.g., based on data or information stored in or accessible via the geographic database 111, a calendar application 109, etc.). In this example, the system 100 can determine that at or about the current time (e.g., "Tuesday 3:30 p.m."), the user is likely to have difficulty finding available parking and/or the spatial data associated with such parking will be relatively very high, as shown by the spatial data graph 513. Alternatively, in one instance, the system 100 can determine that the spatial footprint of a taxi 535 would be relatively lower because the user could avoid having to park the vehicle 523 and a bike 511 or a public transportation option (not shown for illustrative purposes) may be even lower. This may be particularly true if the user could use a shared bike 511 since the spatial data assigned to the user based on either a shared bike 511 or public transportation (e.g., a bus) would be temporary in duration, whereas parking the vehicle 523 in a relatively crowded area for several hours could prevent other people from parking in the same spot during the duration. In one embodiment, the system 100 can generate the UI 501 such that a user can interact with the icons/inputs 535 and 511 to request a pickup and/or reserve a shared bike, respectively.

Figure 5D:
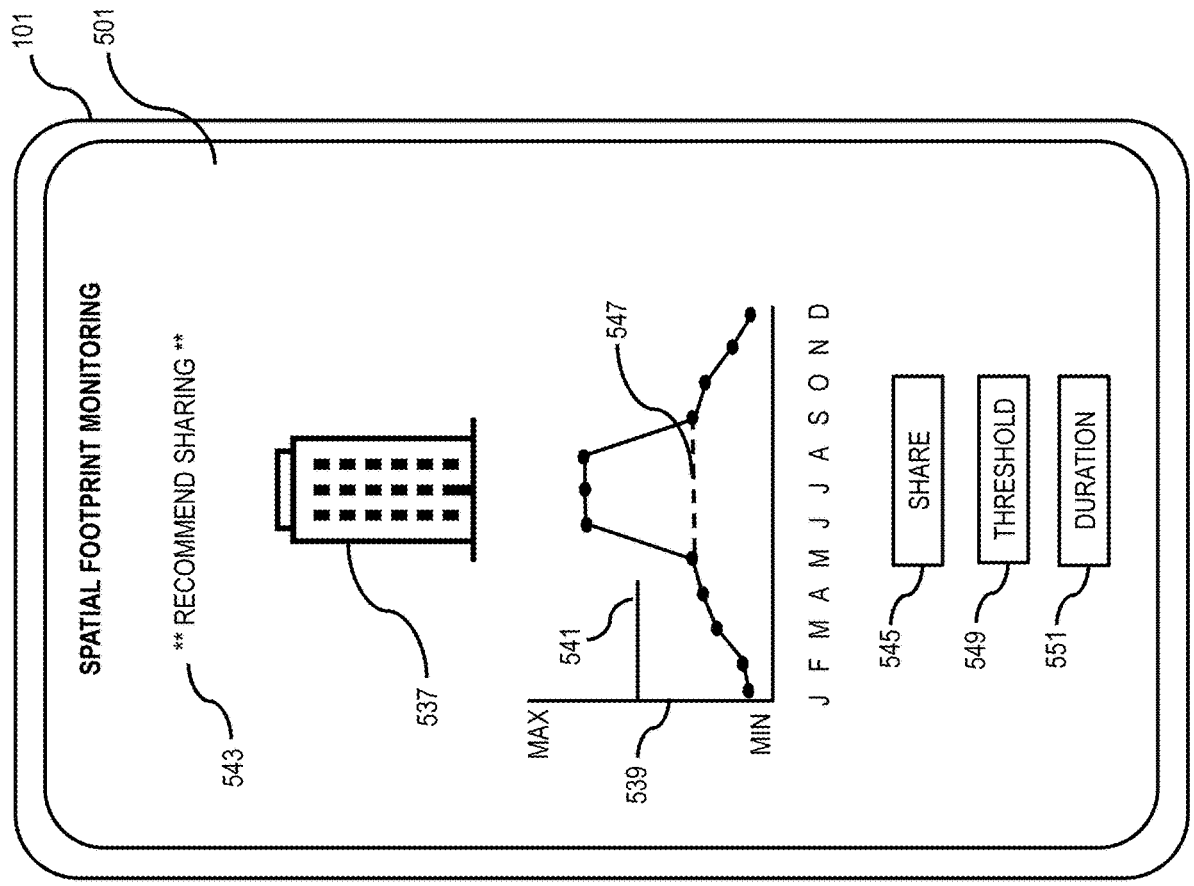

Referring to FIG. 5D ("Spatial Footprint Monitoring"), in one embodiment, the system 100 can generate the UI 501 such that a user can monitor (e.g., in real time or substantially real time) the spatial data associated with one or more items associated with the user (e.g., a home, a vehicle 113, etc.). In this example, the item is an apartment 537, which is in a relatively densely populated area (e.g., New York). As shown by the chart 539, the spatial data of the apartment 537 is relatively low during most of the year since the apartment 537 is occupied by the user. However, during the summer months, the spatial data of the apartment 537 is relatively high since the user is out of town and the apartment 537 is unoccupied.

In one embodiment, if the system 100 determines that the spatial data of the item (e.g., based on the various embodiments described herein) exceeds a certain threshold 541, the system 100 can recommend to the user via a notification 543 (e.g., "Recommend Sharing") that the user share the item with other people (e.g., family, friends, third-parties, etc.) to reduce the spatial data associated with the item. In one embodiment, the system 100 can generate the UI 501 such that it includes an input 545 ("share") to enable the user to see the likely spatial "savings" 547 that the user would gain by sharing the apartment 537. In one instance, the input 545 may also enable a user to connect the item to a third-party sharing application, for example, to facilitate the actual sharing of the item.

In one instance, the system 100 can generate the UI 501 such that it includes an input 549 (e.g., "threshold") to enable the user to adjust the threshold spatial data level 541 relative to the min or max level for the item to adjust when the system 100 will provide a recommendation to the user. For example, in certain context, the amount of spatial data "savings" may be of such a level that the user may not wish to be bothered. In one embodiment, the system 100 can generate the UI 501 such that it includes an input 551 (e.g., "duration") to enable the user to increase or decrease the amount of time that the item will be shared with others on the premise that the duration for which the item (e.g., apartment 537) is assigned to someone else would reduce the owner's overall spatial footprint index for that duration.

Figure 5E:
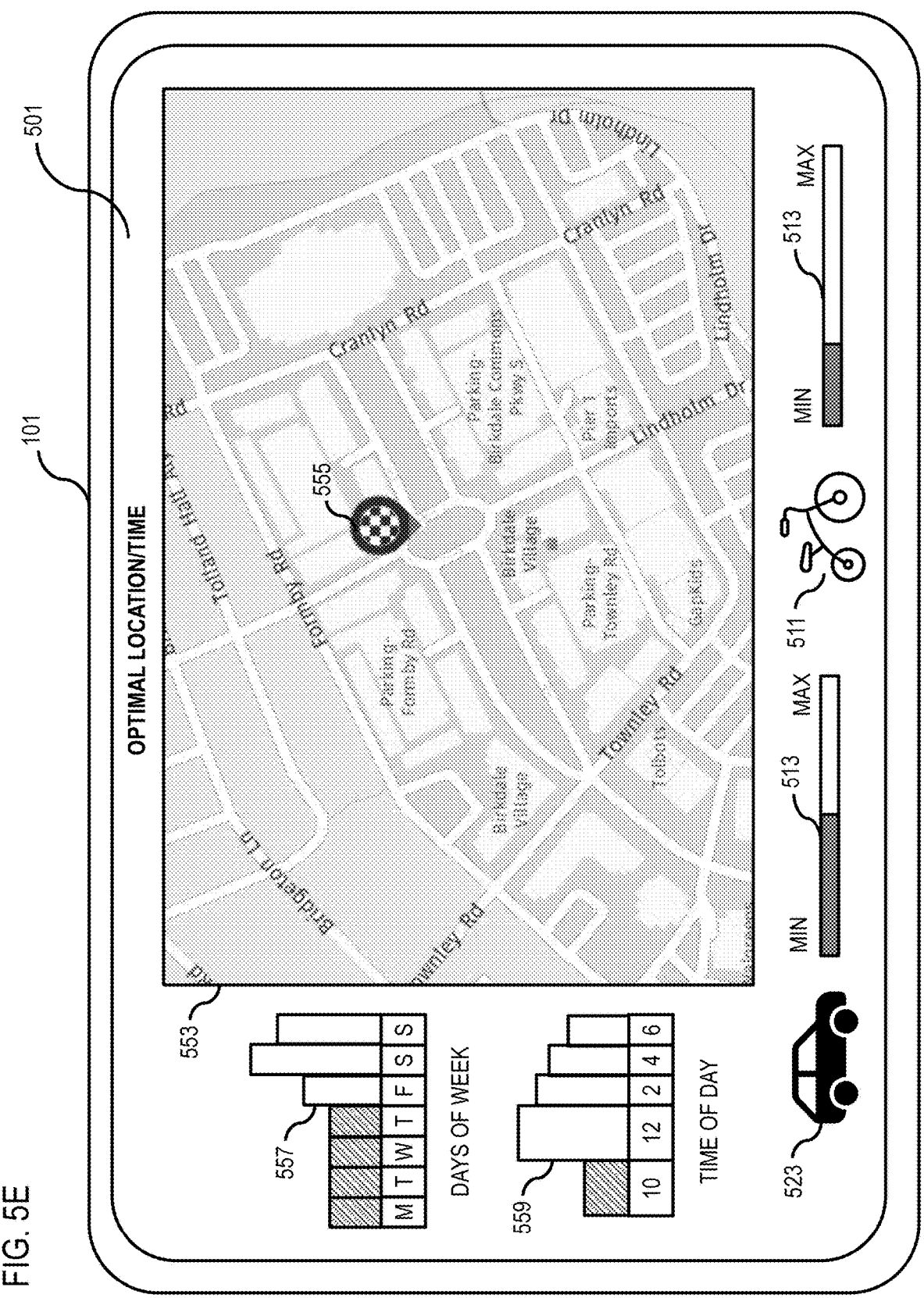

Referring to FIG. 5E ("Optimal Location/Time"), in one embodiment, the system 100 can generate the UI 501 such that it can help a user decide the optimal location and/or time to accomplish a task (e.g., shopping), while keeping the corresponding spatial data and/or spatial footprint index as limited as possible. In one instance, the system 100 can recommend via the digital map 553 that the user go to the outdoor shopping area 555 due to the extensive available parking associated with the location compared to a shopping area located in a relatively crowded area (e.g., a city center).

In one embodiment, the system 100 can generate the UI 501 such that it can provide the user with the average or historic mobility data associated with the shopping area 555 (e.g., stored in or accessible via the geographic database 111) and provide that data to the user via one or more interactive charts (e.g., interactive charts 557 and 559). In one instance, the system 100 can generate the UI 501 such that it includes an interactive chart 557 (e.g., "days of week") and an interactive chart 559 (e.g., "time of day") to enable the user to better understand the optimal time of week and time of day to optimize their spatial footprint (e.g., Monday-Thursday at 10 a.m.) for accomplishing the task (e.g., shopping). In one embodiment, the system 100 can generate the UI 501 such that a user can select the day of the week and/or the time of the day so that the system 100 can represent the spatial data "cost" for each item (e.g., vehicle 523 and bike 511) as depicted by the spatial data graphs 513. It is contemplated that during the time with the relatively least traffic (e.g., vehicle and pedestrian), the system 100 can determine that the vehicle 523 and the bicycle 511 may have a similar spatial data value; however, during the times with the relatively most traffic, the system 100 can determine that the vehicle 523 has a much greater spatial cost (e.g., requiring a valuable parking spot) compared to the bicycle 511.

Returning to FIG. 1, in one embodiment, the UEs 101 (e.g., a mobile device, a smartphone, etc.) may be associated with any user (e.g., an individual, a consumer, etc.), any person driving or traveling in a vehicle 113, or with any vehicles 113 (e.g., an embedded navigation system) in a given area (e.g., the area 115). By way of example, the UEs 101 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with the vehicles 113 or any combination thereof, including the accessories and peripherals of these devices, or any combination thereof. It is also contemplated that a UE 101 can support any type of interface to the user (such as "wearable" circuitry, etc.). In one embodiment, the vehicles 113 may have cellular or wireless fidelity (Wi-Fi) connection either through the inbuilt communication equipment or from a UE 101 associated with the vehicles 113. Also, the UEs 101 may be configured to access the communication network 105 by way of any known or still developing communication protocols. In one embodiment, the UEs 101 may include the indexing platform 103 to compute a spatial footprint index.

In one embodiment, the UEs 101 include device sensors 107 (e.g., GPS sensors, location sensors, a front facing camera, a rear facing camera, LiDAR sensors, sound sensors, height sensors, tilt sensors, moisture sensors, pressure sensors, wireless network sensors, etc.) and applications 109 (e.g., mapping applications, inventory and/or cataloging applications, shared goods and services applications, communication applications, routing applications, real-time traffic applications, POI-based applications, etc.). In one example embodiment, the GPS sensors 107 can enable the UEs 101 to obtain geographic coordinates from satellites 119 for determining current or live location and time. Further, a user location within an area may be determined by a triangulation system such as A-GPS, Cell of Origin, or other location extrapolation technologies when cellular or network signals are available.

In one embodiment, the indexing platform 103 performs the process for computing a spatial footprint index as discussed with respect to the various embodiments described herein. In one embodiment, the indexing platform 103 can be a standalone server or a component of another device with connectivity to the communication network 105. For example, the component can be part of an edge computing network where remote computing devices (not shown) are installed along or within proximity of an intended destination (e.g., a city center).

In one embodiment, the machine learning system 117 of the indexing platform 103 can include a neural network or other machine learning system to compute the sum of the distributed spatial footprints (directly and indirectly) through the belongings associated with a user, a set of users, or a combination thereof over time as well as the relevant additional contextual information (such as map data, population density, events, etc.). In one instance, the machine learning system 117 can select or assign respective weights, correlations, relationships, etc. among the one or more physical items, the user, the set of users, or a combination thereof based on one or more of the following: (1) the movement of the one or more physical items, the user, the set of users, or a combination thereof; (2) the duration associated with a use of the one or more physical items, a travel by the user or the set of users, or a combination thereof; or (3) the context associated with the user of the one or more physical items, the travel by the user or the set of users, or a combination thereof. For example, the machine learning system 117 can assign relatively greater weight to a vehicle 113 parked in a relatively densely populated area compared to a relatively sparsely populated area. In one instance, the machine learning system 117 can assign relatively more weight to a vehicle 113 that is only used by one person compared to a vehicle 113 that is shared by more than person (e.g., used in carpooling). In one instance, the machine learning system 117 can generate insights and/or recommendations regarding how to reduce a spatial footprint index. The machine learning system 117 can also compute volumes of footprints (e.g., a volume of an apartment or office building) and can compute distributions of a spatial footprint across multiple users when one place/area/vehicle 113 is shared, particularly where one or more of the multiple users are in motion.

In one embodiment, the machine learning system 117 can iteratively improve the speed and accuracy by which the system 100 can determine the overall spatial footprint index for an individual based on the space taken by and around those belongings. For example, the machine learning system 117 can iteratively improve the speed by which the system 100 can track in time a person, compute the relevant buffer zone based on a context (e.g., location and/or movement), and estimate the total footprint in "real time" or rather for every moment. In one embodiment, the neural network of the machine learning system 117 is a traditional convolutional neural network which consists of multiple layers of collections of one or more neurons (which are configured to process a portion of an input data). In one embodiment, the machine learning system 117 also has connectivity or access over the communication network 105 to the geographic database 111 that can store labeled or marked features (e.g., size, duration, context costs, static/dynamic allocation, population density models, area specific mobility graphs, historical movement patterns, respective weights or weighting schemes, etc.).

In one embodiment, the indexing platform 103 has connectivity over the communications network 105 to the services platform 121 (e.g., an OEM platform) that provides the services 123a-123n (also collectively referred to herein as services 123) (e.g., navigation services, cataloguing or indexing services, etc.). By way of example, the services 123 may also include data collections services, mapping services, population modeling services, shared vehicle or mobility services, autonomous vehicle services, traffic incident services, travel planning services, notification services, social networking services, content (e.g., audio, video, images, etc.), application services, storage services, contextual information determination services, location-based services, information-based services (e.g., weather, news, etc.), etc. In one embodiment, the services platform 121 uses the output of the indexing platform 103 (e.g., spatial data corresponding to an item, a spatial footprint index, or a combination thereof) to provide location-based services such as navigation, mapping, etc. (e.g., recommending the optimal time to visit a place to accomplish a task while optimizing the spatial footprint).

In one embodiment, the content providers 125a-125n (also collectively referred to herein as content providers 125) may provide content or data about a user, a user's goods (e.g., size, duration, context costs), map data and attributes, road and lane attributes, traffic data (e.g., vehicle and pedestrian), parking-related data, event data, POI-based data mobility graphs, historical movement patterns, area population or density models, etc. to the UEs 101, the indexing platform 103, the applications 109, the geographic database 111, the vehicles 113, the machine learning system 117, the services platform 121, and the services 123. The content provided may be any type of content, such as map content, text-based content, audio content, video content, image content, etc. In one embodiment, the content providers 125 may provide content regarding the movement of a UE 101, a vehicle 113, or a combination thereof on a digital map or link as well as content that may aid in localizing a user path or trajectory on a digital map or link to assist, for example, with determining the location of a user, an item, or a user relative to an item (e.g., an autonomous vehicle 113). In one embodiment, the content providers 125 may also store content associated with the indexing platform 103, the geographic database 111, the vehicles 113, the services platform 121, and/or the services 123. In another embodiment, the content providers 125 may manage access to a central repository of data, and offer a consistent, standard interface to data, such as a repository of the geographic database 111.

In one embodiment, a UE 101 and/or a vehicle 113 may be part of a probe-based system for collecting probe data to calculate a location of an item, a location of one or more users (e.g., a user or a set of users), a location of one or more users relative to an item, or a combination thereof. In one embodiment, each UE 101 and/or vehicle 113 is configured to report probe data as probe points, which are individual data records collected at a point in time that records telemetry data for that point in time. In one embodiment, the probe ID can be permanent or valid for a certain period. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 113 may include one or more vehicle sensors 127a-127a (also collectively referred to as vehicle sensors 127) (e.g., GPS sensors, LiDAR sensors, etc.) for reporting measuring and/or reporting one or more physical items, road and lane attributes, volumes, etc. The attributes can also be any attribute normally collected by an on-board diagnostic (OBD) system of the vehicles 113, and available through an interface to the OBD system (e.g., OBD II interface or other similar interface).

In one embodiment, the probe points can be reported from the UEs 101 and/or the vehicles 113 in real-time, in batches, continuously, or at any other frequency requested by the system 100 over, for instance, the communication network 105 for processing by the indexing platform 103. The probe points also can be map matched to specific road links stored in the geographic database 111. In one embodiment, the system 100 can generate user or vehicle paths or trajectories from the observed and expected frequency of probe points for an individual probe so that the probe traces represent routes for all available transport modes, user historical routes, or a combination thereof through a given area (e.g., an urban area, rural area, etc.).

In one embodiment, as previously stated, the vehicles 113 can be configured with various sensors (e.g., vehicle sensors 127) for generating or collecting probe data, sensor data, related geographic/map data (e.g., traffic data), etc. In one embodiment, the sensor data may be associated with a geographic location or coordinates at which the sensor data was collected (e.g., a latitude and longitude pair). In one embodiment, the probe data (e.g., stored in or accessible via the geographic database 111) includes location probes collected by one or more vehicle sensors 127. By way of example, the vehicle sensors 127 may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, NFC, etc.), temporal information sensors, a camera/imaging sensor for gathering image data, an audio recorder for gathering audio data, velocity sensors mounted on a steering wheel of the vehicles 113, switch sensors for determining whether one or more vehicle switches are engaged (e.g., driving lights on), and the like. Though depicted as automobiles, it is contemplated the vehicles 113 can be any type of private, public, or shared manned or unmanned vehicle (e.g., cars, trucks, buses, vans, motorcycles, scooters, bicycles, drones, etc.) that can traverse a given area (e.g., an urban area, a city center, etc.).

Other examples of vehicle sensors 127 may include light sensors, orientation sensors augmented with height sensors and acceleration sensor (e.g., an accelerometer can measure acceleration and can be used to determine orientation of the vehicle), tilt sensors to detect the degree of incline or decline of a vehicle 113 along a path of travel, moisture sensors, pressure sensors, etc. In a further example embodiment, vehicle sensors 127 about the perimeter of a vehicle 113 may detect the relative distance of the vehicle 113 from a physical divider, a lane line of a link or roadway, the presence of other vehicles, pedestrians, traffic lights, potholes and any other objects, or a combination thereof. In one scenario, the vehicle sensors 127 may detect contextually available information such as weather data, traffic information, or a combination thereof. In one embodiment, a vehicle 113 may include GPS or other satellite-based receivers 127 to obtain geographic coordinates from satellites 119 for determining current location and time in relation to a user, a set of users, or a combination thereof. Further, the location can be determined by visual odometry, triangulation systems such as A-GPS, Cell of Origin, or other location extrapolation technologies.

In one embodiment, the UEs 101 may also be configured with various sensors (e.g., device sensors 107) for acquiring and/or generating probe data and/or sensor data associated with a user, a vehicle 113 (e.g., a driver or a passenger), other vehicles, attributes or characteristics of one or more physical items (e.g., size, context cost, etc.), attributes or characteristics of a given area (e.g., population density). For example, the device sensors 107 may be used as GPS receivers for interacting with the one or more satellites 119 to determine a user location (origin) as well as to track the current speed, position and location of a user or a vehicle 113 travelling along a link or on a road segment (e.g., when recording travel times, dwell times, area specific mobility patterns, etc.). In addition, the device sensors 107 may gather tilt data (e.g., a degree of incline or decline of a vehicle 113 during travel), motion data, light data, sound data, image data, weather data, temporal data, and other data associated with the UEs 101 and/or vehicles 113. Still further, the device sensors 107 may detect a local or transient network and/or wireless signals (e.g., transaction information), such as those transmitted by nearby devices during navigation along a roadway (Li-Fi, NFC), etc.

It is noted therefore that the above described data may be transmitted via the communication network 105 as probe data according to any known wireless communication protocols. For example, each UE 101, application 109, user, and/or vehicle 113 may be assigned a unique probe identifier (probe ID) for use in reporting or transmitting said probe data collected by the UEs 101 and/or vehicles 113. In one embodiment, each UE 101 and/or vehicle 113 is configured to report probe data as probe points, which are individual data records collected at a point in time that records telemetry data.

In one embodiment, the indexing platform 103 retrieves aggregated probe points gathered and/or generated by the device sensors 107 and/or vehicle sensors 127 specific times resulting from the travel of the UEs 101 and/or vehicles 113 on a road segment of a road network of a digital map space, the indexing or cataloging of one or more items (e.g., via geotagged photographs, scans, etc.), or a combination thereof. In one instance, the geographic database 111 stores a plurality of probe points and/or trajectories generated by different UEs 101, device sensors 107, applications 109, vehicles 113, and vehicle sensors 127, etc. over time. A time sequence of probe points specifies a trajectory—i.e., a path traversed by a UE 101, a vehicle 113, etc. over that time.

In one embodiment, the communication network 105 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for 5G New Radio (5G NR or simply 5G), microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the indexing platform 103 may be a platform with multiple interconnected components. The indexing platform 103 may include multiple servers, intelligent networking devices, computing devices, components, and corresponding software for providing parametric representations of lane lines. In addition, it is noted that the indexing platform 103 may be a separate entity of the system 100, a part of the services platform 121, a part of the one or more services 123, or included within a vehicle 113 (e.g., an embedded navigation system).

In one embodiment, the geographic database 111 can store information or data regarding one or more physical items or belongings (e.g., size, duration, average or historic buffer zone, static/dynamic nature, context costs, etc.). In one instance, the geographic database 111 can store information or data relative to geotagged photographs and/or scans, tax declarations or documents related to one or more belongings, registration information (e.g., user assignment at purchase time), etc. In one embodiment, the geographic database 111 can store information or data regarding use or ownership of one or more items by one or more users. In one instance, the geographic database 111 can store information or data regarding historic mobility and/or population density of one or more areas (e.g., a city center, the area 115, etc.), one or more POIs (e.g., on average crowded days of the week, times of the day, etc.). In one embodiment, the geographic database 111 can store information or data regarding one or more recommended uses of one or more items to reduce a spatial footprint index (e.g., where to park a vehicle 113). The information may be any of multiple types of information that can provide means for computing a spatial footprint index. In one embodiment, the geographic database 111 can be in a cloud and/or in a UE 101, a vehicle 113, or a combination thereof.

By way of example, the UEs 101, indexing platform 103, device sensors 107, applications 109, vehicles 113, satellites 119, services platform 121, services 123, content providers 125, and/or vehicle sensors 127 communicate with each other and other components of the system 100 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 6:
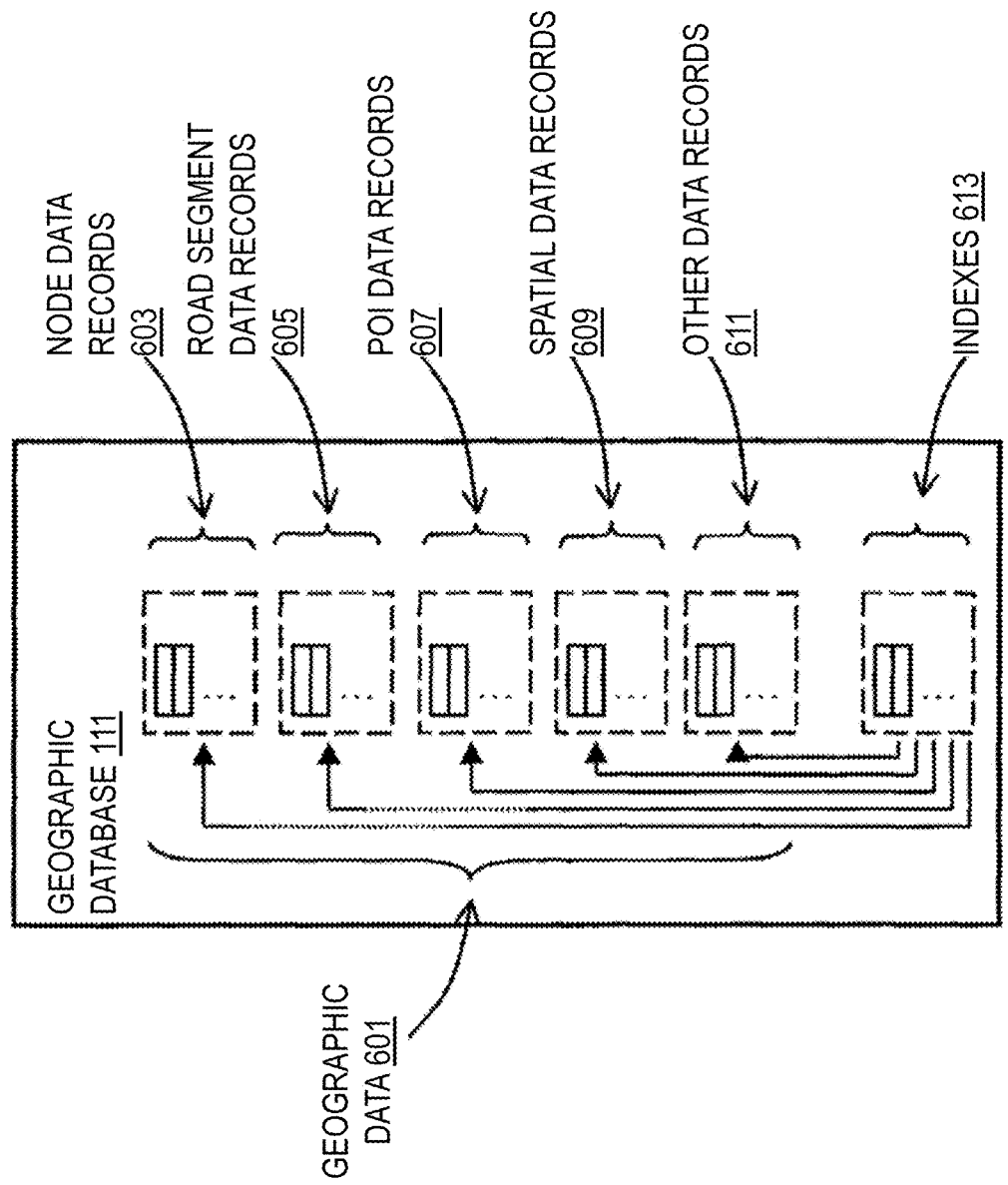
FIG. 6 is a diagram of a geographic database, according to example embodiment(s)

FIG. 6 is a diagram of a geographic database, according to example embodiment(s). In one embodiment, the geographic database 111 includes geographic data 601 used for (or configured to be compiled to be used for) mapping and/or population modeling-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 111.

"Node"—A point that terminates a link.

"Line segment"—A straight line connecting two points.

"Link" (or "edge")—A contiguous, non-branching string of one or more-line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon (e.g., a hexagon) is constructed from one outer simple polygon and none or at least one inner simple polygon. A polygon is simple if it just consists of one simple polygon, or complex if it has at least one inner simple polygon.

In one embodiment, the geographic database 111 follows certain conventions. For example, links do not cross themselves and do not cross each other except at a node. Also, there are no duplicated shape points, nodes, or links. Two links that connect each other have a common node. In the geographic database 111, overlapping geographic features are represented by overlapping polygons. When polygons overlap, the boundary of one polygon crosses the boundary of the other polygon. In the geographic database 111, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 111 includes node data records 603, road segment or link data records 605, POI data records 607, spatial data records 609, other records 611, and indexes 613, for example. More, fewer, or different data records can be provided. In one embodiment, additional data records (not shown) can include cartographic ("cartel") data records, routing data, and maneuver data. In one embodiment, the indexes 613 may improve the speed of data retrieval operations in the geographic database 111. In one embodiment, the indexes 613 may be used to quickly locate data without having to search every row in the geographic database 111 every time it is accessed. For example, in one embodiment, the indexes 613 can be a spatial index of the polygon points associated with stored feature polygons.

In exemplary embodiments, the road segment data records 605 are links or segments representing roads, streets, or paths (e.g., that are unique to an area) that can be used for computing a spatial footprint index. The node data records 603 are end points corresponding to the respective links or segments of the road segment data records 605. The road link data records 605 and the node data records 603 represent a road network, such as used by vehicles 113 and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as a restaurant, a retail shop, an office, etc. The geographic database 111 can include data about the POIs and their respective locations in the POI data records 607. In one embodiment, the POI data records 607 can include population density data, hours of operation, popularity or preference data, prices, ratings, reviews, and various other attributes. The geographic database 111 can also include data about places, such as cities, towns, or other communities, and other geographic features, such as bodies of water, mountain ranges, etc. Such place or feature data can be part of the POI data records 607 or can be associated with POIs or POI data records 607 (such as a data point used for displaying or representing a portion of a city).

In one embodiment, the geographic database 111 includes spatial data records 609 associated with one or more belongings or physical items (e.g., size, static and/or dynamic nature, duration, context costs, etc.). In one instance, the spatial data records 609 include assignments of each user's belongings or physical items, the quantified representation of the physical space occupied by each item (directly and directly), historic or average buffer zones (e.g., both contextual and non-contextual based), volumes of belongings, and/or distributions of spatial data across multiple users where relevant. By way of example, the spatial data records 609 may be previously or recently recorded data, crowd-sourced data (e.g., real-time buffer zones), or a combination thereof. In one instance, the spatial data records 609 may also include mobility graph/mobility patterns for a particular user, set of users, and/or given area (e.g., the area 115), ranking or probability weights or weighting schemes, labeled and/or marked features and attributes, and/or any other related data. In one embodiment, the spatial data records 609 can be associated with one or more of the node data records 603, road segment or link records 605, and/or POI data records 607; or portions thereof (e.g., smaller or different segments than indicated in the road segment records 605) to compute a spatial footprint index.

In one embodiment, the geographic database 111 can be maintained by the services platform 121 (e.g., a map developer). The map developer can collect human movement data to generate and enhance the geographic database 111. There can be different ways used by the map developer to collect data. These ways can include obtaining data from other sources, such as municipalities or respective geographic authorities. In addition, the map developer can employ field personnel to travel by a vehicle 113 along roads throughout an area of interest (e.g., area 115) to observe and/or record map data, traffic data, volumes of building, parking restrictions/costs, nearby event data, etc. Similarly, the map developer can employ field personnel to travel by foot throughout an area of interest (e.g., area 115) to observe can catalogue information about users, user's goods, and mobility patterns. Also, remote sensing, such as aerial or satellite photography, can be used. Again, it should be noted that all data should be collected and processed in a privacy compliant way as much of this data related to people's identities, movements, and belongings is highly sensitive information.

In one embodiment, the geographic database 111 include high resolution or high definition (HD) mapping data that provide centimeter-level or better accuracy of map features. For example, the geographic database 111 can be based on LiDAR or equivalent technology to collect billions of 3D points and model road surfaces and other map features down to the number lanes and their widths. In one embodiment, the HD mapping data capture and store details such as the slope and curvature of the road, lane markings, roadside objects such as signposts, including what the signage denotes. By way of example, the HD mapping data enable highly automated vehicles 113 to precisely localize themselves on a road, and to determine the road attributes (e.g., direction of traffic) at high accuracy levels.

In one embodiment, the geographic database 111 is stored as a hierarchical or multi-level tile-based projection or structure. More specifically, in one embodiment, the geographic database 111 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 111 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, a device sensor 107, a vehicle 113, and/or a vehicle sensor 127. The navigation-related functions can correspond to vehicle navigation (e.g., autonomous navigation), pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for computing a spatial footprint index may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
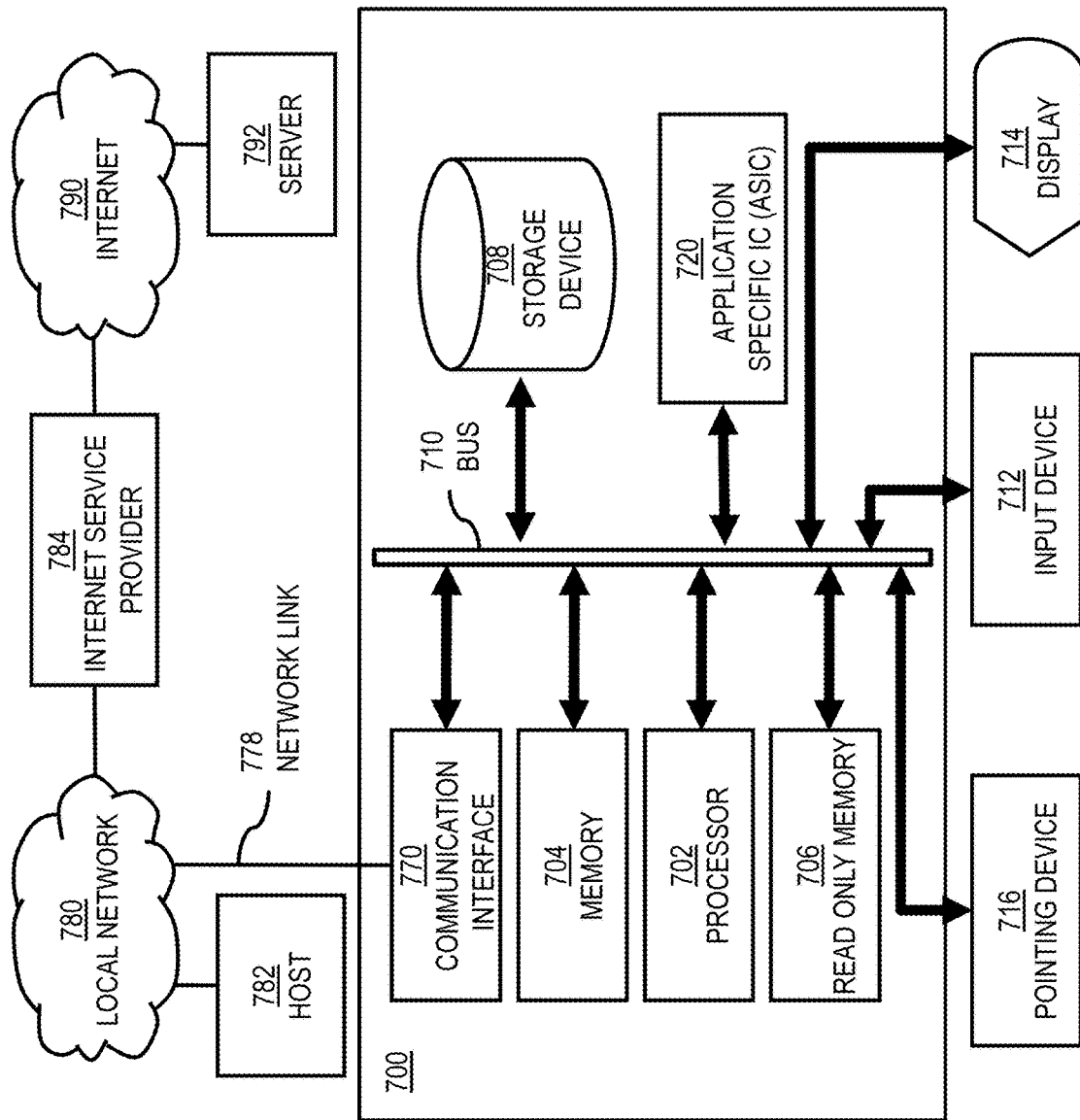
FIG. 7 is a diagram of hardware that can be used to implement example embodiment(s)

FIG. 7 illustrates a computer system 700 upon which example embodiment(s) of the invention may be implemented. Computer system 700 is programmed (e.g., via computer program code or instructions) to compute a spatial footprint index as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to computing a spatial footprint index. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random-access memory (RANI) or other dynamic storage device, stores information including processor instructions for computing a spatial footprint index. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for computing a spatial footprint index, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners, and external disks. In general, the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic, or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for computing a spatial footprint index.

The term computer-readable medium is used herein to refer to any medium that participates in providing information to processor 702, including instructions for execution. Such a medium may take many forms, including, but not limited to, non-volatile media, volatile media, and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system can be deployed in various configurations within other computer systems, e.g., host 782 and server 792.

FIG. 8 illustrates a chip set 800 upon which example embodiment(s) of the invention may be implemented. Chip set 800 is programmed to compute a spatial footprint index as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively, or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to compute a spatial footprint index. The memory 805 also stores the data associated with or generated by the execution of the inventive steps.

Figure 9:
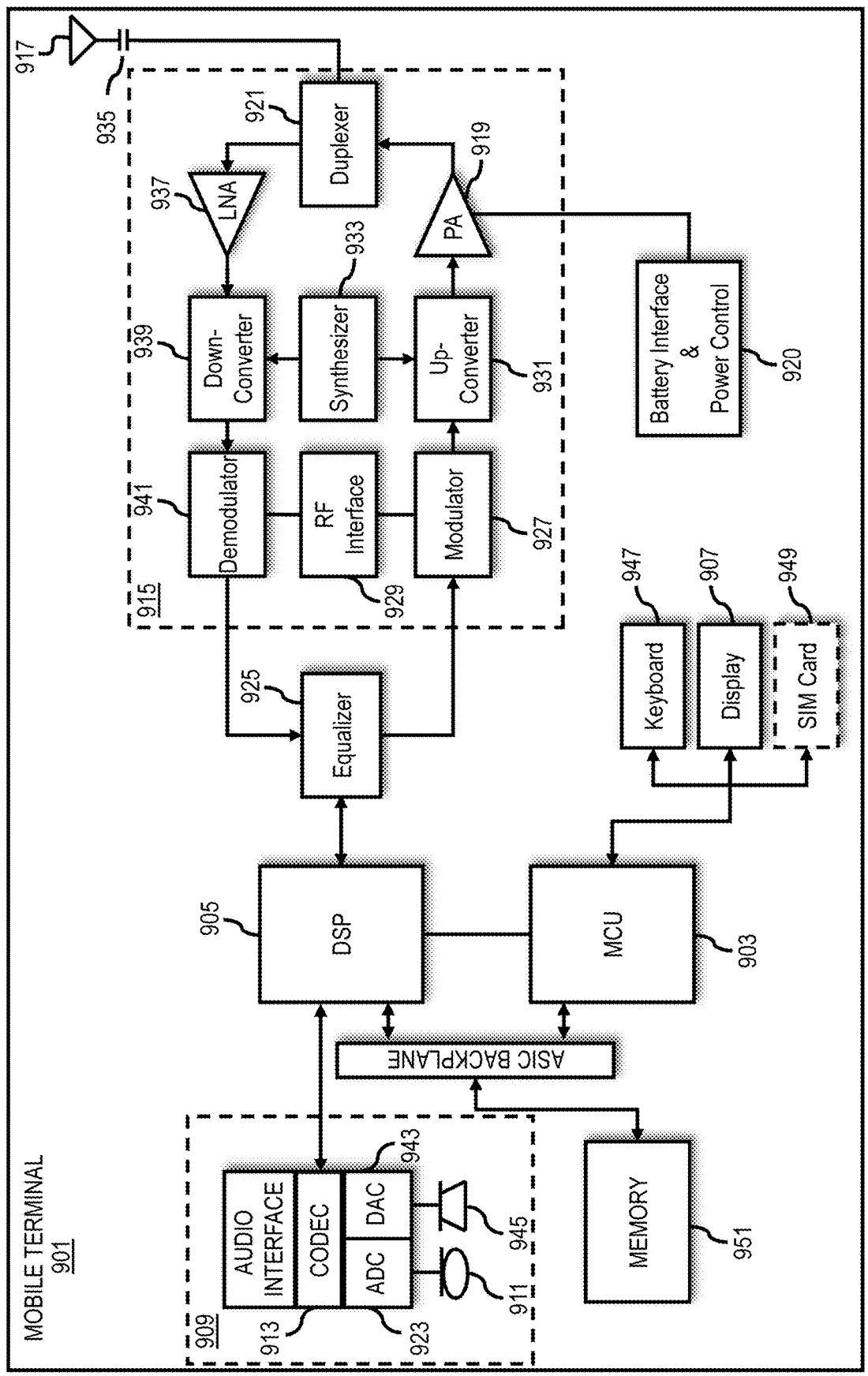
FIG. 9 is a diagram of a mobile terminal (e.g., handset or vehicle or part thereof) that can be used to implement example embodiment(s).

FIG. 9 is a diagram of exemplary components of a mobile terminal 901 (e.g., a UE 101, a vehicle 113, or a component thereof) capable of operating in the system of FIG. 1, according to example embodiment(s). Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 to compute a spatial footprint index. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 951 may be, but not limited to, a single memory, CD, DVD, ROM, RAM, EEPROM, optical storage, or any other non-volatile or non-transitory storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:
1. A method comprising:
 receiving, by one or more processors, information indicating that one or more physical items are one or more belongings of a user, a set of users, or a combination thereof;

determining, by the one or more processors, spatial data indicating a physical space occupied by the one or more physicals items;

computing, by the one or more processors, a spatial footprint index for the user, the set of users, or a combination thereof based on the spatial data, wherein the spatial footprint index is a quantified representation of a sum of the physical space occupied by the one or more belongings of the user, the set of users, or a combination thereof, wherein a weighting value is applied to at least one item of the one or more physical items to compute the spatial footprint index based on either (1) a population density that indicates a crowdedness of a place in which the at least one item is located, or (2) a duration of use of the at least one item; and providing, by the one or more processors, the spatial footprint index as an output.

2. The method of claim 1, further comprising:
determining, by the one or more processors, mobility pattern data indicating a movement of the one or more physical items, the user, the set of users, or a combination thereof,
wherein the spatial data, the spatial footprint index, or a combination thereof is further based on a buffer zone; and
wherein the buffer zone is determined based on where the user, the set of users, or a combination thereof is located as determined from the mobility pattern data.

3. The method of claim 2, wherein the mobility pattern data indicates a mode of transport, and wherein the spatial data, the spatial footprint index, or a combination thereof is further based on the mode of transport.

4. The method of claim 1, wherein the weighting value is greater for a longer duration of use.

5. The method of claim 4, further comprising:
determining, by the one or more processors, a context associated with the use of the one or more physical items, the travel by the user or the set of users, or a combination thereof,
wherein the spatial footprint index is further based on the context.

6. The method of claim 1, further comprising:
determining, by the one or more processors, a recommended use of the one or more physical items based on the spatial footprint index,
wherein the recommended use is selected to reduce the spatial footprint index, and wherein the output comprises the recommended use.

7. The method of claim 6, wherein the recommended use includes moving the one or more physical items to areas associated with a reduced weighting of the spatial footprint index.

8. The method of claim 6, wherein the recommended use relates to using the one or more physical items to transport the user, the set of users, or a combination thereof to a place.

9. The method of claim 1, wherein the weighting value is greater for a greater population density.

10. The method of claim 1, wherein the output comprises a user interface representing the spatial footprint index, the spatial data, or a combination thereof.

11. The method of claim 1, further comprising:
determining, by the one or more processors, a recommended context for the recommended use to reduce the spatial footprint index.

12. The method of claim 11, wherein the recommended context includes a recommended place, a recommended time, or a combination thereof for the recommended use.

13. The method of claim 1, wherein the spatial data includes at least one of:
the physical space occupied directly by the one or more physicals items, the user, the set of users, or a combination thereof; or
the physical space occupied indirectly by the one or more physicals items, the user, the set of users, or a combination thereof by incorporating a buffer space around the one or more physicals items, the user, the set of users, or a combination thereof.

14. The method of claim 13, further comprising:
determining, by the one or more processors, the buffer space based on a density of people or other objects within a proximity threshold of the one or more physical items, the user, the set of users, or a combination thereof.

15. The method of claim 1, further comprising:
monitoring, by the one or more processors, an evolution of the spatial footprint index over a period time; and
providing, by the one or more processors, the monitoring as another output.

16. The method of claim 1, wherein the one or more physical items are associated with the user, the set of users, or a combination thereof based on a static allocation indicating an ownership, a dynamic allocation indicating a duration of use, or a combination thereof.

17. An apparatus comprising:
at least one processor; and
at least one memory including computer program code for one or more programs,
the at least one memory and the computer program code configured to, with the at least one processor, cause the apparatus to perform at least the following operations:
receive, by one or more processors, information indicating that one or more physical items are one or more belongings of a user, a set of users, or a combination thereof;
determine, by the one or more processors, spatial data indicating a physical space occupied by the one or more physicals items;
compute, by the one or more processors, a spatial footprint index for the user, the set of users, or a combination thereof based on the spatial data, wherein the spatial footprint index is a quantified representation of a sum of the physical space occupied by the one or more belongings of the user, the set of users, or a combination thereof, wherein a weighting value is applied to at least one item of the one or more physical items to compute the spatial footprint index based on either (1) a population density that indicates a crowdedness of a place in which the at least one item is located, or (2) a duration of use of the at least one item; and
provide, by the one or more processors, the spatial footprint index as an output.

18. The apparatus of claim 17, wherein the one or more physical items are associated with the user, the set of users, or a combination thereof based on a static allocation indicating an ownership, a dynamic allocation indicating a duration of use, or a combination thereof.

19. A non-transitory computer-readable storage medium having stored thereon one or more program instructions which, when executed by one or more processors, cause an apparatus to at least perform the following operations:

receiving, by the one or more processors, information indicating that one or more physical items are one or more belongings of a user, a set of users, or a combination thereof;

determining, by the one or more processors, spatial data indicating a physical space, a buffer space, or a combination thereof occupied by the one or more physicals items;

computing, by the one or more processors, a spatial footprint index for the user, the set of users, or a combination thereof based on the spatial data, wherein the spatial footprint index is a quantified representation of a sum of the physical space occupied by the one or more belongings of the user, the set of users, or a combination thereof, wherein a weighting value is applied to at least one item of the one or more physical items to compute the spatial footprint index based on either (1) a population density that indicates a crowdedness of a place in which the at least one item is located, or (2) a duration of use of the at least one item; and providing, by the one or more processors, the spatial footprint index as an output.

20. The non-transitory computer-readable storage medium of claim 19, wherein the apparatus is further caused to perform:

determining, by one or more processors, the buffer space based on a density of people or other objects within a proximity threshold of the one or more physical items, the user, the set of users, or a combination thereof.

\* \* \* \* \*